United States Patent [19]
Singh et al.

[11] Patent Number: 6,022,821
[45] Date of Patent: Feb. 8, 2000

[54] MODIFIED KAOLINS

[75] Inventors: Balbir Singh, Woodlands; Ian Donald Richard MacKinnon, Ellengrove, both of Australia

[73] Assignee: The University of Queensland, St. Lucia, Australia

[21] Appl. No.: 09/051,783

[22] PCT Filed: Oct. 23, 1996

[86] PCT No.: PCT/AU96/00667

§ 371 Date: Apr. 15, 1998

§ 102(e) Date: Apr. 15, 1998

[87] PCT Pub. No.: WO97/15427

PCT Pub. Date: May 1, 1997

[30] Foreign Application Priority Data

Oct. 23, 1995 [AU] Australia ................................. PN6142

[51] Int. Cl.[7] ................................................. B01J 21/16
[52] U.S. Cl. .............................. 502/84; 502/60; 502/62; 502/80; 502/85
[58] Field of Search .................... 502/60, 62, 80, 502/84, 85

[56] References Cited

U.S. PATENT DOCUMENTS 3,271,323  9/1966  Whittemore .............................. 502/80
5,672,555  9/1997  Maxwell et al. ......................... 501/147

*Primary Examiner*—Thomas Dunn
*Attorney, Agent, or Firm*—Arnold White & Durkee

[57] ABSTRACT

A process for the preparation of a modified kaolin from a kaolin group mineral which includes expansion and contraction of layers of the kaolin group mineral. The layers comprising one Si-tetrahedral sheet and one Al-octahedral sheet. The expansion and contraction may be initiated by initial intercalation of a reagent which can penetrate kaolin layers to reach an interlayer region therebetween to form an intercalate. Subsequently, the intercalation nay be followed by de-intercalation which involves the removal of the reagent. By the above process, there is provided crystalline modified kaolins having the following properties: (i) an increased interlayer space compared to corresponding kaolin group minerals; (ii) an increased susceptibility to intercalation by cations, anions or salts compared to corresponding kaolin group minerals; and (iii) an increased exfoliated morphology compared to corresponding kaolin group minerals.

34 Claims, 17 Drawing Sheets

Step-1
Intercalation

Step-2
Dehydroxylation

Step-3
Extraction

MODIFIED KAOLINS

FIELD OF THE INVENTION

Kaolin clays, composed of one sheet of tetrahedrally co-ordinated Si and one sheet of octahedrally co-ordinated Al, have a restricted capacity to intercalate as opposed to 2:1 structures of montmorillonites. This limited capacity to accommodate compounds from solution has meant little use of these abundant minerals as catalyst, sorbents or as porous materials, while montmorillonites have seen a continuous growth. The capacity of kaolins to intercalate can be enhanced by repeated expansion and contraction of layers, a process which modifies the atomic scale structure of these minerals. The newly derived capacity of these clays makes them useful precursors for preparation of adsorbents, catalysts, and porous materials.

BACKGROUND OF INVENTION

Clay minerals, also known as hydrous layer silicates, are part of a larger family of minerals called phyllosilicates or layer silicates. A unit layer of a given clay mineral is typically composed of a two dimensional arrangement of tetrahedral and octahedral sheets, each with specific elemental composition. The tetrahedral sheet may have composition of $T_2O_5$ where T, the tetrahedral cation, is Si, Al and/or Fe, and the octahedral sheet commonly contains cations such as Al, Fe and Mg. A tetrahedral sheet containing only $Si^{4+}$ cations is electrically neutral, as are Mg-octahedral sheets and Al octahedral sheets with one third vacant sites. Both tetrahedral and octahedral sheets can have cationic substitutions resulting in a net negative charge which is balanced by interlayer cations. The type of sheets in a unit layer, degree of substitutions, and stacking of layers vary greatly, and determine the type and economic usefulness of a given clay mineral.

Clay minerals can be broadly classified into 2:1 and 1:1 type on the basis of type of sheets in a unit layer. The 2:1 type clay minerals are composed of one octahedral sheet sandwiched between two tetrahedral sheets (FIG. 1). The upper tetrahedral sheet is inverted so that apical oxygens point down and are shared by the octahedral sheet. When all the sites in the tetrahedral sheet are occupied by Si and all sites in the octahedral sheet are occupied by Mg or two-thirds of the sites are occupied by Al, the resulting layers are electrically neutral. In nature, these conditions are exemplified by talc and pyrophyllite, respectively. Electrically neutral layers of these minerals are coupled by weak dipolar and van der Waals forces. There is no driving force for attraction of interlayer cations or intercalating compounds. Therefore, these minerals have little use as exchangers or adsorbents.

In contrast to talc and pyrophyllite, layers in mica bear a net negative charge of 1e per $Si_8O_{20}$ unit due to excessive cationic substitutions in the tetrahedral sheet. The resultant net negative charge is balanced by interlayer $K^+$, which is coordinated to the hexagonal array of oxygen atoms on either side of the interlayer space. The interlayer K strongly binds the layers and resist intercalation and exchange processes for these minerals.

While pyrophyllite-talc group and mica group minerals represent the extreme cases with either no or excessive charge, the smectite group represent 2:1 clay minerals with an intermediate level of charge, usually ranging from 0.2 to 0.6 e per $Si_8O_{20}$. Whilst the net negative charge on smectites is sufficient to hold exchangeable cations and a provide driving force for intercalation, it is not too excessive and localised, as in micas, to resist swelling of layers. The interlayer charge in smectites is usually balanced by intercalated alkaline earth or alkali metals which can be readily exchanged with desired cations.

Some smectites (such as beidellite and nontronite) derive their charge from substitutions in tetrahedral sheets, while others derive their charge from substitutions in octahedral sheets. The layer charge in tetrahedrally charged smectites is relatively localised, which results in greater three dimensional order and -poorer intercalation, swelling and exchange properties. In the octahedrally charged smectites, the layer charge is uniformly distributed in the oxygen framework due to the octahedral sheet being sandwiched between tetrahedral sheets. As a result, the adjoining layers are randomly stacked with little three dimensional order. These octahedrally charged smectites, called montmorillonites, have been extensively exploited as sorbents, exchangers and pillared clays.

The 1:1 type clay minerals, the other most abundant clay mineral type, are composed of one Si-tetrahedral sheet and one Al-octahedral sheet (FIG. 2). Unlike 2:1 type minerals, the constituent sheets of all 1:1 type clays have practically no cationic substitutions. As a result, 1:1 layers are electrically neutral and lack cation exchange and swelling properties which are the centre piece of montmorillonites.

While kaolins do not possess any interlayer net negative charge, their 1:1 structure does have the advantage of having a polar interlayer region due to 1:1 sheet configuration (FIG. 2). In other words, one side of the interlayer space is lined with oxygens, while the other side is lined by hydroxyls. This polar nature of the interlayer region can potentially attract a variety of organic and inorganic compounds into the interlayer. For these reasons, kaolins possess a limited intercalation capacity while their electrically neutral 2:1 analogues, talc and pyrophyllite, exhibit no intercalation behaviour.

However, intercalation capacity of kaolins is restricted due to the layers being strongly coupled by H-bonds between the surface hydroxyls of the octahedral sheet and basal oxygens of the tetrahedral sheet. The strength of interlayer bonding and consequent intercalation capacity varies among various kaolins depending on the history of their formation. Due to the interlayer region being protected from the reacting species by strong interlayer H-bonding, any exchange and reactivity in these minerals is generally provided by OH groups on the edges of the crystals, which only make a small proportion of total OH groups present in the 1:1 minerals.

Besides this restrictive role, interlayer bonding also restricts the entry of intercalating molecules which are attracted to the polar nature of the interlayer region. Only some polar compounds such as potassium acetate (KAc) and dimethyl sulphoxide (DMSO) are able to intercalate kaolins as opposed to a wide variety that can intercalate smectites.

In the scientific press, there is abundant literature on the intercalation capacity of kaolins particularly kaolinite and halloysite. Reviews by Wada, 1959, American Mineralogist 44 153–165 and Carr et al., 1978, Clays and Clay Minerals 26 144–152 list the compounds that can intercalate kaolin clays to some degree. As is evident in these reviews, kaolins can intercalate only some highly polar molecules or salts of univalent alkali metals such as potassium acetate and alkali metal halides. Kaolins are, as these authors have stated in their reviews, unable to intercalate salts of divalent cations such as Ca, Mg, Cu, Ni etc. This is the principal reason why kaolins have not been able to find extensive applications as sorbents, catalysts and porous materials. Clearly, successful intercalation or exchange of ions or molecules of certain divalent or trivalent metals into the interlayer is necessary for preparation of useful catalytic, adsorbent or porous materials from kaolins.

Therefore, it is highly desirable to improve the intercalation capacity of the kaolin interlayer region so that desired organic or inorganic compound may be intercalated into these clays. The new intercalation complexes thus formed can be then further treated using prior art or novel processes to form new materials for applications in catalysis, ceramics, uptake of pollutants etc.

We have discovered that the ability of kaolin clays to intercalate compounds can be increased many fold. The kaolin clays modified in this way are able to readily intercalate compounds that make no or only weak complexes with untreated kaolins.

The 1:1 group clay minerals comprise the polymorphs kaolinite, nacrite, dickite and halloysite. Kaolinite, dickite and nacrite have a chemical composition $Al_2Si_2O_5(OH)_4$ and differ only in the manner in which the 1:1 layers are stacked. Halloysite has the composition $Al_2Si_2O_5(OH)_4 \cdot 2H_2O$ and differs from the other three polytypes in that molecular water occupies the interlayer site in its hydrated form. Kaolinite is most abundant in the kaolin group and has many applications in the paper industry, ceramics, electrical insulation and the like. This disclosure primarily describes results for kaolinite and halloysite. However, it will be appreciated by those skilled in the art that the invention applies equally to other members of the kaolin group clays.

Kaolins occur widely in many parts of the world and are, in general, more abundant than montmorillonite clays. In tropical and subtropical regions, kaolin clays are particularly common, and often overlie precious metal ores deposits. Kaolin clays also commonly underlie bauxite deposits such as bauxite deposits in Weipa, North Queensland, Australia. In such situations, kaolin clays are a cheap byproduct of metal or other ore mineral mining. Not all types of kaolins are suitable for paper coating, ceramics and other current applications of kaolins. Consequently, much of the kaolin produced as a byproduct of mining activity remains unused and poses a significant disposal problem.

Recently, there has been a renewed interest in utilising kaolin, and several new materials and processes have been disclosed which utilise kaolin clays as their raw material. For example, International Publication No. WO96/18577 discloses a process to synthesise materials of high cation exchange and moderate surface area by reacting kaolin clays with alkali metal hydroxides. A similar patent application International Publication No. WO95/00441 describes a process of treating kaolin clays with alkali metal carbonates and hydroxides at elevated temperatures to produce material of high cation exchange but low surface area. In this set of processes the kaolin structure is completely destroyed in highly basic or high temperature conditions and an X-ray amorphous material or a material of a structure completely different from layered structure of kaolin is formed.

U.S. patent (U.S. Pat. No. 5,416,051) describes a process to prepare pillared clays using kaolin clays. According to this disclosure, metakaolin is first prepared by firing untreated kaolin at temperatures sufficient to dehydroxylate kaolin and then treating the metakaolin with pillaring agents. The metakaolin prepared by calcining kaolin is a amorphous material structurally and chemically different from kaolin.

None of the disclosures in the patent literature or publications in the scientific literature attempts to enhance the intercalation capacity of kaolin clays without radically destroying its structure.

Kaolins may find additional applications if new kaolin based materials could be readily manufactured with desirable properties such as higher BET surface area and/or higher cation exchange capacity and/or higher density of active sites for applications such as catalysis. Additionally, the usefulness of these new materials made from kaolins would be greater if only one of these properties were evident or if other properties such as adsorption or uptake of other elements or compounds were enhanced over that of unprocessed kaolinite. These elements and compounds may be in the liquid or gaseous state.

Accordingly, it is an object of the present invention to provide modified forms of kaolinite which show enhanced properties over that of the original starting kaolinite through treatment with a suitable reagent.

SUMMARY OF THE INVENTION

According to one aspect of the present invention, there is provided a process for the preparation of a modified kaolin, which comprises a repeated expansion and contraction of kaolin layers using suitable reagent(s). Each cycle of expansion and contraction progressively modifies the structure of a starting kaolin by introducing an unspecified type of disorder/order. The repetition of those cycles are continued to a level where the resulting kaolin is (significantly) structurally different from the starting kaolin and has significantly greater capacity to intercalate salts and compounds of non-univalent cations.

Although it is believed that the first cycle of expansion and contraction causes some structure level changes, its effect is hardly noticeable in terms of observable fundamental characteristics of the kaolin or significantly increased capacity to intercalate in the case where the kaolin has a relatively high degree of disorder. An object of the invention is the process of repeated expansion and contraction of the layers, and the unexpected discovery that each subsequent cycle continues to modify the structure, resulting in significant improvement in intercalation properties of the kaolin after a number of cycles.

Expansion of kaolin layers is effected by intercalation. Any reagent which can readily penetrate layers of untreated kaolin would be suitable for this process. The review by Carr et al., 1978, Clays and Clay Minerals 26 144–152 lists a number of compounds which can intercalate into untreated kaolins. The preferred reagent is a polar molecule such as potassium acetate (KAc), dimethylsulfoxide (DMSO), n-methylformamide (NMF) or any other similar species able to expand untreated kaolins. The use of any organic or inorganic molecule is suitable in this preferred method.

The intercalation can be effected and controlled by many methods known to those skilled in the art, such as by increasing the temperature or concentration of the reagents in a mixture with kaolin group minerals. Preferably, the mixture is a dispersed suspension of kaolin and reagent although other methods of intercalation for kaolin group minerals are known. The reagent concentration and solid to solution ratio can be varied depending on the type of kaolin and type of reagent. Temperature of the reaction may be controlled anywhere between room temperature and 200° C. Obviously, at temperatures higher than 100° C., a suitable reaction vessel to contain the resulting pressure would be required.

Alternatively, the kaolin can be intercalated by grinding the clay with a solid reagent for a suitable length of time as described by Mackinnon et al., 1995, "Grinding of kaolinite improves intercalate yield" In: Clays: Controlling the Environment, Proc. 10th Int. Clay Conf., Adelaide, Australia, 1993, pp 196–200, G. J. Churchman, R. W. Fitzpatrick and R. A. Eggleton, Editors. Kaolins can also be intercalated by exposure to vapours of volatile compounds at a suitable temperature and pressure.

The intercalation is then followed by a de-intercalation process so that the intercalant is removed from the interlayer and the kaolin layers are contracted. The de-intercalating process can be effected by washing the intercalate with water if intercalating compounds are soluble in water. In the case of volatile organic compounds, such as DMSO and NMF, de-intercalation can also be effected by mild heating of the intercalate in air. In some cases, de-intercalation can take place by simply diluting the intercalating solution below a critical concentration.

In a preferred form, the repeated process of intercalation and de-intercalation is effected without washing the slurry, which is considerably low-cost as it eliminates the need for repeated centrifugation of the clay slurries. According to this process, clay is mixed with a solution of intercalant in water. The concentration of intercalant is gradually increased, by addition of solid intercalant, to exceed the critical concentration (FIG. 3). Preferably, the intercalant concentration is raised to a level at which most of the clay expands. A suitable consistency of the slurry to allow gentle mixing is maintained. After complete intercalation has occurred, the concentration of the intercalant is gradually decreased below the critical concentration by adding water while gently mixing the slurry. The concentration is reduced, preferably, to a concentration where most of the clay de-intercalates ($C_0$). In order to effect intercalation again after the de-intercalation step, the slurry is simply heated to remove the excess water and raise the intercalant concentration above the critical concentration. In brief, the intercalant concentration is varied between $C_0$ and $C_{100}$ (see FIG. 3) by addition and removal of water by heating. The process fully conserves the intercalant during repeated cycles. Heat and water used in the process can also be easily recycled to a large extent using common methods.

The process of intercalation and de-intercalation can be suitably monitored by use of conventional characterisation techniques such as X-ray diffraction. For example, in the case of intercalation with KAc, the basal spacings for kaolinite will expand from 0.71 nm to ~1.4 nm with intercalation and, with suitable washing and drying, will return to ~0.71 nm upon de-intercalation. However, as this process approaches formation of modified kaolin the basal spacings remain substantially higher than that of the original kaolinite.

The number of cycles required depends on the nature of the starting kaolin group mineral. However, the number of cycles are usually more than 10 and can be as high as 60 depending on the type of kaolin, type of intercalant and temperature of reaction. In a preferred form of invention, the process of intercalation and de-intercalation is repeated many times, preferably for greater than twenty times, depending on the reagent used, although similar effects can be observed for most kaolinites with lower levels of intercalation and de-intercalation.

Since the number of cycles required depends on the nature of the starting kaolin, it is conceivable that natural kaolins can be found which only need 2–10 cycles to achieve the desired properties.

After treating with a desired number of expansion and contraction cycles, the final kaolin product is thoroughly washed to remove the intercalating agent. The product can then be dried or kept wet if further intercalation with complex ions is required.

The fundamental characteristics of the modified kaolin depend to a large extent on the characteristic of the type of starting kaolin, but they show a significant modification with respect to the starting kaolin. For example, typical XRD pattern of dry modified kaolinite and its starting kaolinite (Georgia kaolinite KGa-1) are given in FIG. 4, and XRD data derived from XRD patterns are given in TABLE 1. As shown, these fundamental characteristics indicate that the resulting product is consistent with kaolin (e.g. a basal spacing of ~0.71 nm). However, the critical basal diffraction peaks of the modified kaolinite are considerably broader than those of starting kaolinite, indicating large scale exfoliation of the layers and/or widening of the layer spacings. The exfoliated nature kaolin particles is also demonstrated by transmission electron micrographs of the modified kaolinite (FIG. 5). Similarly, there is considerable change in the relative intensities of certain reflections, suggesting atomic scale modification of the structure. The chemical composition is consistent with the starting kaolinite (TABLE 2).

Furthermore, other properties such as ability to exchange or absorb other chemical species are significantly enhanced compared with the original kaolinite. For example, modified kaolin readily intercalates with salts of divalent metals such as Ca and Mg, whereas untreated kaolins do not intercalate with these salts. In FIG. 6 are shown the XRD pattern of modified kaolinite and untreated kaolinite intercalated with $CaCl_2$ according to the procedure outlined in EXAMPLE 8. As is evident in these patterns, modified kaolinite has formed a well developed intercalate with $CaCl_2$, indicated by expansion of the layer spacing, whereas kaolinite shows no intercalation. A similar intercalation affinity of modified kaolinite towards $MgCl_2$ is demonstrated in FIG. 7.

Examples of modified kaolinite with increased cation exchange capacity (CEC) values over the original starting kaolin are given in TABLE 3. CEC was determined by exchanging cations with $NH_4^+$ using the procedure outlined in International Publication No. WO96/18577. In another preferred form, the resulting powder of modified kaolin can absorb twice as much water as the starting kaolin. TABLE 4 demonstrates the capacity of modified kaolin to absorb water compared with that for halloysite as noted in EXAMPLE 5.

The modified form of kaolin is then suitable for further processing or modification to produce desired intercalates or metal impregnated kaolins. Alternatively modified kaolin can be further processed to form amorphous derivatives with useful properties such as high cation exchange capacity, high surface area, high oil absorption or all of these properties in useful combinations.

An application of this modified kaolin is the formation of metal-impregnated or compound impregnated kaolins due to its readiness to intercalate a range of compounds. For example, modified kaolin can be readily intercalated with alkaline earth metal salts such as $MgCl_2$, $CaCl_2$ and transition metal salts such as $CuCl_2$. In this instance, the uptake of a metal salt is significantly enhanced over that possible by kaolinite (little or no uptake is possible) by the formation of the modified kaolin via an intercalation route. After drying and dehydroxylation as hereinafter described, atomic scale mixtures of the inserted metal with aluminosilicate is produced.

Similarly, new materials with properties suitable for use in ceramics, catalysis or other chemical reactions may be made from the production of modified kaolin through the intercalation of such polar inorganic molecules and subsequent intercalation of other salts.

According to another aspect of the present invention, there is provided a process to prepare microporous materials with high surface area and cation exchange capacity. The modified kaolins prepared by the process disclosed above are particularly suitable as a starting materials for this process.

The initial step of this aspect of the invention includes the preparation of salt impregnated kaolins by intercalation (FIG. 8A). Modified kaolins are particularly suitable as starting materials for this process due to their capacity to intercalate a variety of salts. Salts may includes halides, nitrates, sulphates of alkali and alkaline earth metals. The halides of alkali earth metals are particularly suitable for this process.

The second step of this aspect of the invention involves the dehydroxylation of impregnated kaolin preferably by application of heat at a temperature of between 300–900° C. and more preferably 550° and subsequent washing of the product to remove excess salt and any byproduct (FIG. 8B). This step is intended to irreversibly dehydroxylate kaolin clay while the inserted metal ions are present within the unit layers. As a consequence of this step, rows of metal ions are locked in the network of Si and Al tetrahedra of the metakaolin-like material. The product after this step has a low surface area and cation exchange capacity, usually comparable with metakaolin.

In the third step of this aspect of the invention, the inserted metal ions are preferentially extracted out of the Si-Al oxide framework by reacting with a suitable acid (FIG. 8C). Any inorganic or organic acid in a suitable concentration may be used to extract the inserted metal. Hydrochloric and acetic acid are particularly suitable for this process. All of the inserted metal ions may be extracted or extraction may be stopped to extract only a part of the inserted ions. Depending on the type and concentration of the acid used some of the Al may also be extracted. The extraction procedure may be modified to achieve the desired properties of the final product. After partial or complete removal of the inserted metal ions, the material is left with a porous network of Si and Al tetrahedra, with a surface area 10–30 times greater than the starting material. In specific controlled conditions, microporous materials of pore sizes<2 nm are generated with significant microporous volume demonstrated by their Type I isotherm (BDDT classification originally proposed by Brunauer et al., 1940, Journal of American Chemical Society 62 1723).

Such microporous materials suitably have a BET surface area of between 45 and 400 $m^2g^{-1}$ and a CEC of between 50–450 milliequivalents per 100 g.

Since the inserted metal is preferentially extracted to a large extent, i.e. without dismantling the framework of Si-Al tetrahedra, the resulting material is left with a significant cation exchange capacity.

The invention also includes within its scope, a modified kaolin not being an intercalate having the following properties:
(i) an increased interlayer space compared to corresponding kaolin group minerals;
(ii) an increased susceptibility to intercalation by cations, anions or salts compared to corresponding kaolin group minerals; and
(iii) an increased exfoliated morphology compared to corresponding kaolin group minerals.

Such crystalline modified kaolins preferably have an increased full width half maximum (FWHM) for XRD reflections compared to corresponding kaolin group materials.

In regard to the above, the term "corresponding kaolin group minerals" refers to the starting material which is used in the process of the invention to prepare the modified kaolin of the invention. For example, kaolinite when used as a starting material, will enable a modified kaolinite to be prepared by the process of the invention.

After describing the broad conceptual framework of the invention, the following examples are given to further illustrate the preferred aspects of present invention, and are not intended to limit the scope of invention to the specific conditions described therein.

EXAMPLES

Example 1

Preparation of Modified Kaolin from Kaolinite via Potassium Acetate Intercalation

Ten grams of kaolinite supplied by Commercial Minerals ("Microwhite kaolin") is thoroughly mixed with 50 ml of saturated solution of potassium acetate (KAc) in a beaker. The suspension is allowed to intercalate at room temperature for three days or at a higher temperature up to 80° C. (for lesser times) with progress of the intercalation reaction monitored by conventional X-ray diffraction (XRD). After most of the kaolin has expanded, indicated by change of basal spacing from 0.7 nm to 1.4 nm, the suspension is centrifuged and the saturated solution of KAc is removed/decanted. In order to deintercalate the salt, 50 ml of deionized water is added to the clay and thoroughly mixed. The completion of de-intercalation is confirmed by the return of basal spacings to the original value of 0.7 nm. The suspension is centrifuged again to remove excess water. The clay is then ready for the next cycle of intercalation and de-intercalation which is repeated several times. An intercalation time of 30 minutes in subsequent cycles (rather than 3 days at room temperature for the first intercalation) is usually sufficient for maximum intercalation. Again, progress of an intercalation or de-intercalation step is monitored by the basal spacing of the clay using XRD. Each cycle progressively modifies the layer stacking of kaolinite resulting in increasing readiness for intercalation with each subsequent cycle. In a sufficiently modified kaolinite which has been subjected to successive cycles (e.g. >20) of intercalation and de-intercalation, the basal spacing is significantly greater than 0.7 nm due to intercalation of water in the modified kaolinite. After the final intercalation/de-intercalation cycle, the sample is thoroughly washed and dried and subjected to a series of characterisation tests.

Figure 1:
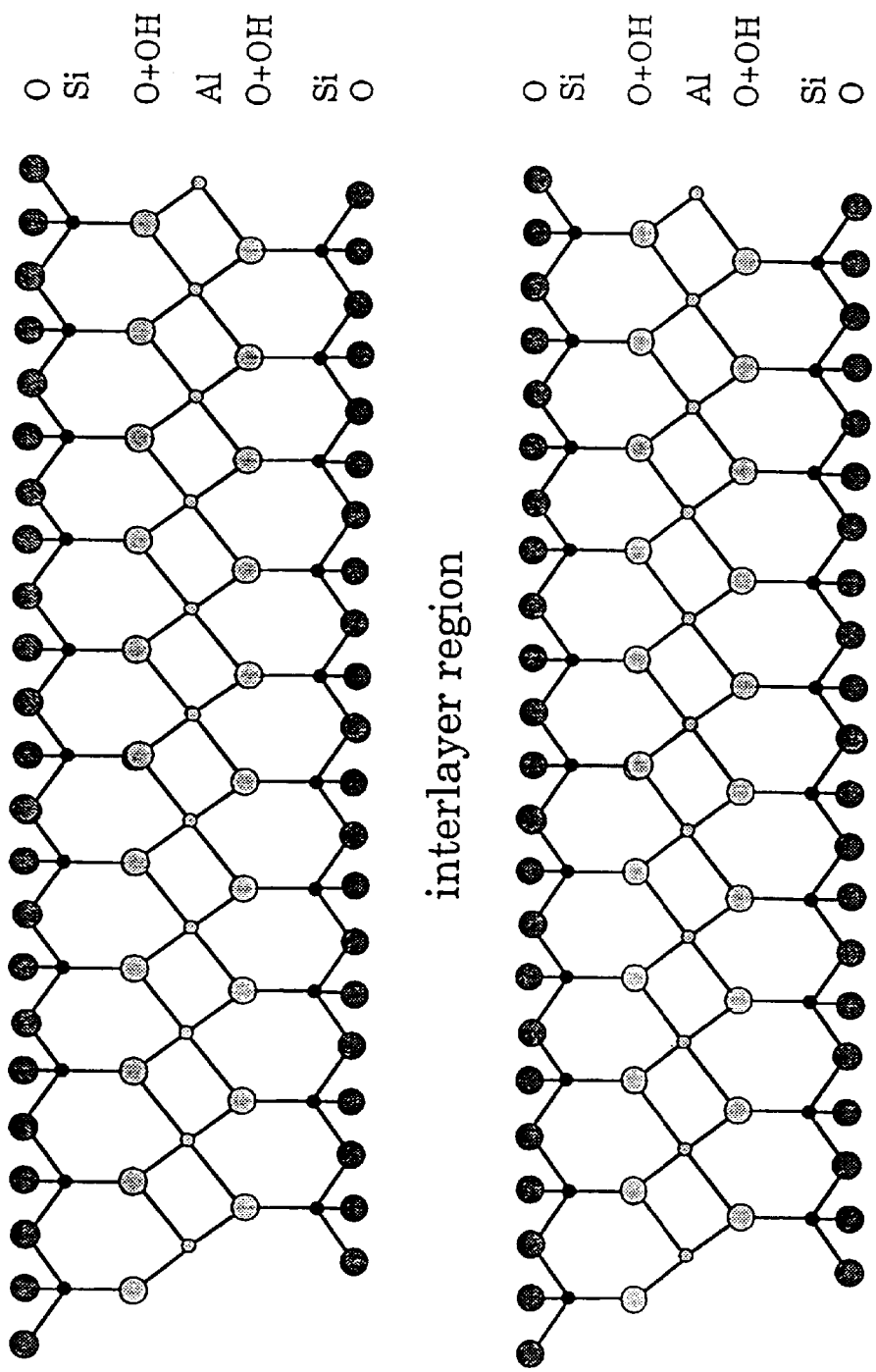
FIG. 1 is a schematic diagram illustrating the structure of 2:1 clay minerals such as montmorillonites and bentonite. The structure of these clays are composed of a Al-sheet sandwiched between two Si-sheets.
Figure 2:
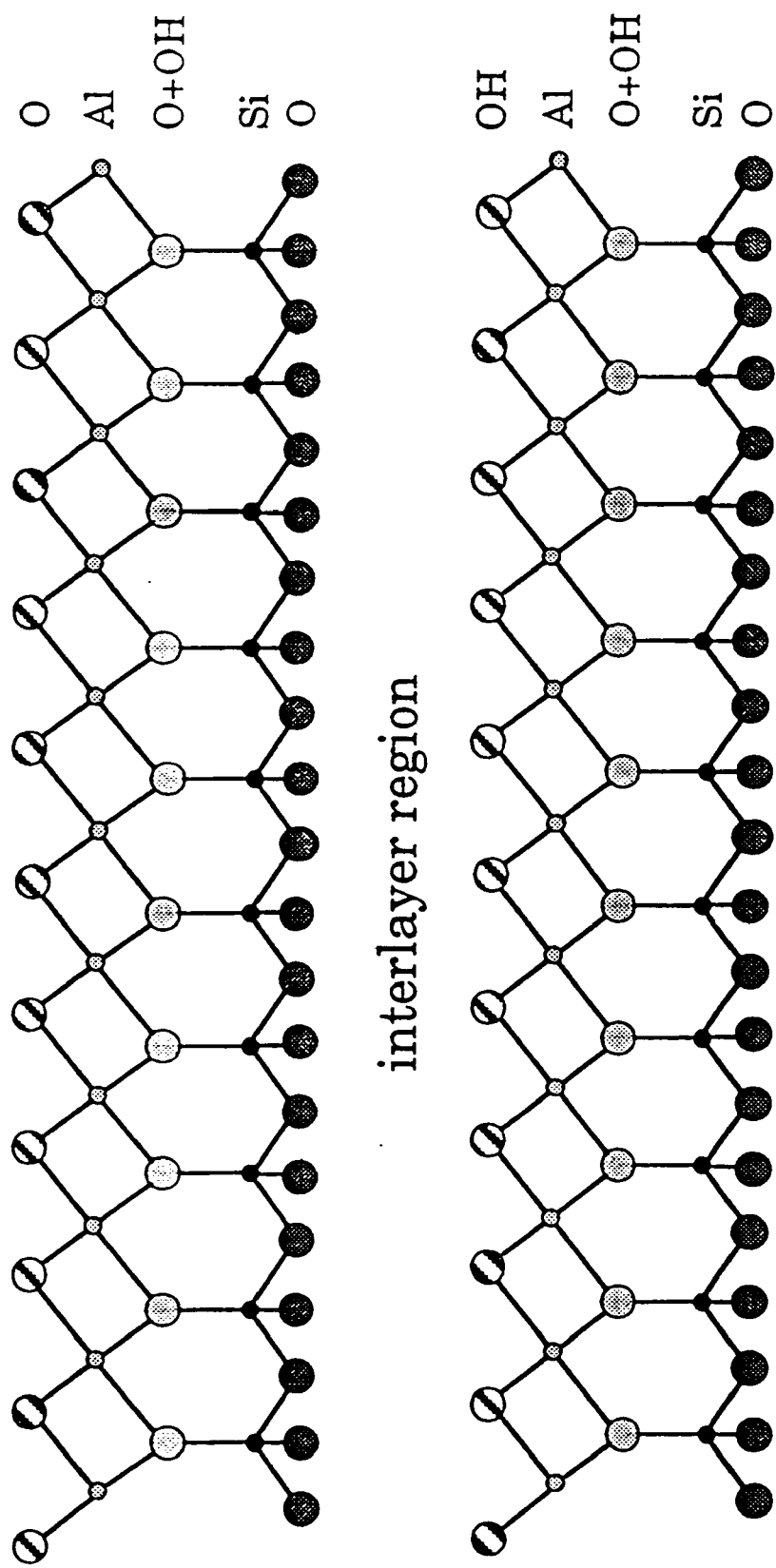
FIG. 2 is a schematic diagram illustrating the 1:1 structure of kaolin clays such as kaolinite, halloysite, dickite and nacrite. The interlayer region of these minerals is lined by hydroxyls and oxygens.
Figure 3:
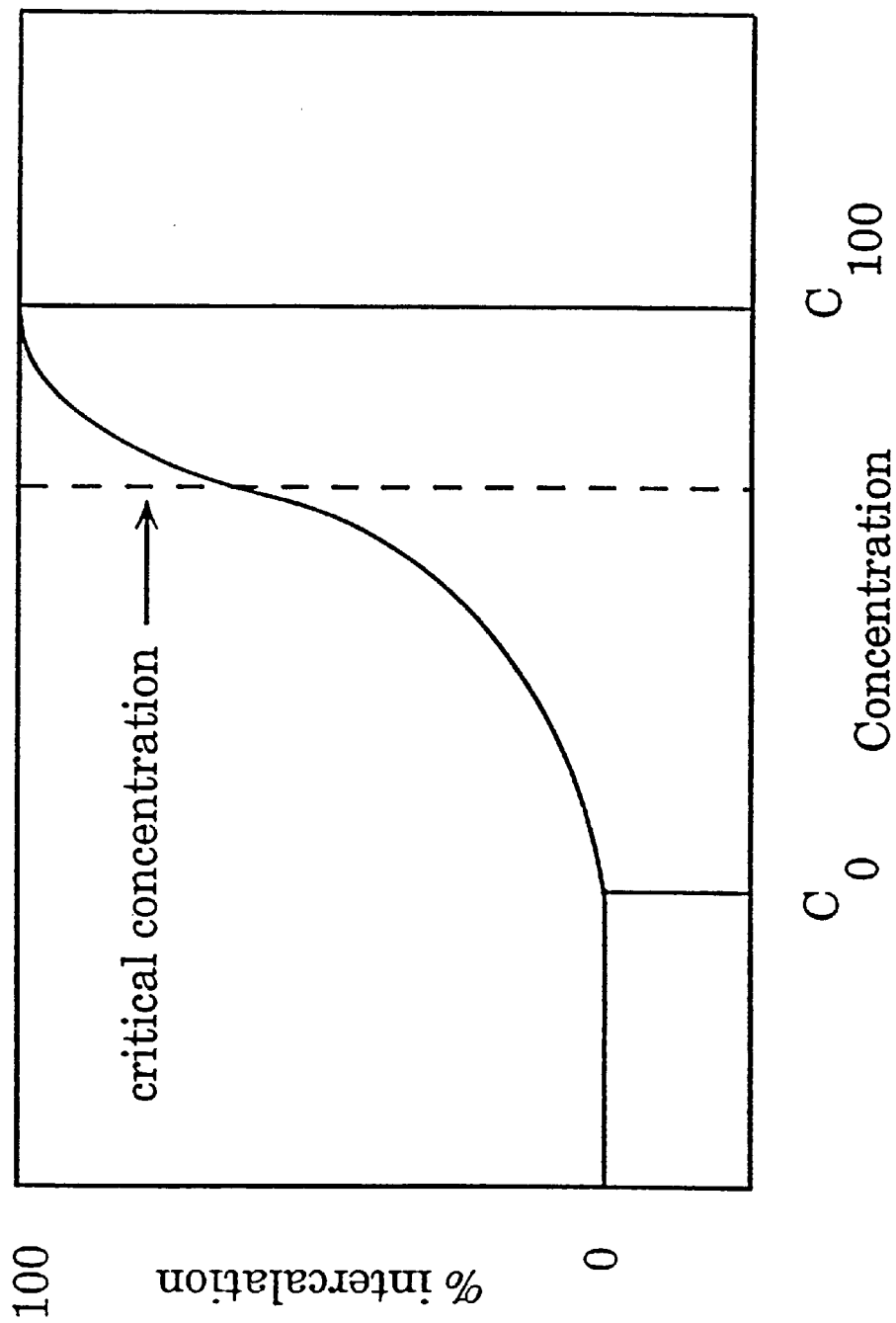
FIG. 3 is an idealised plot of intercalant concentration versus intercalation intensity.
Figure 4:
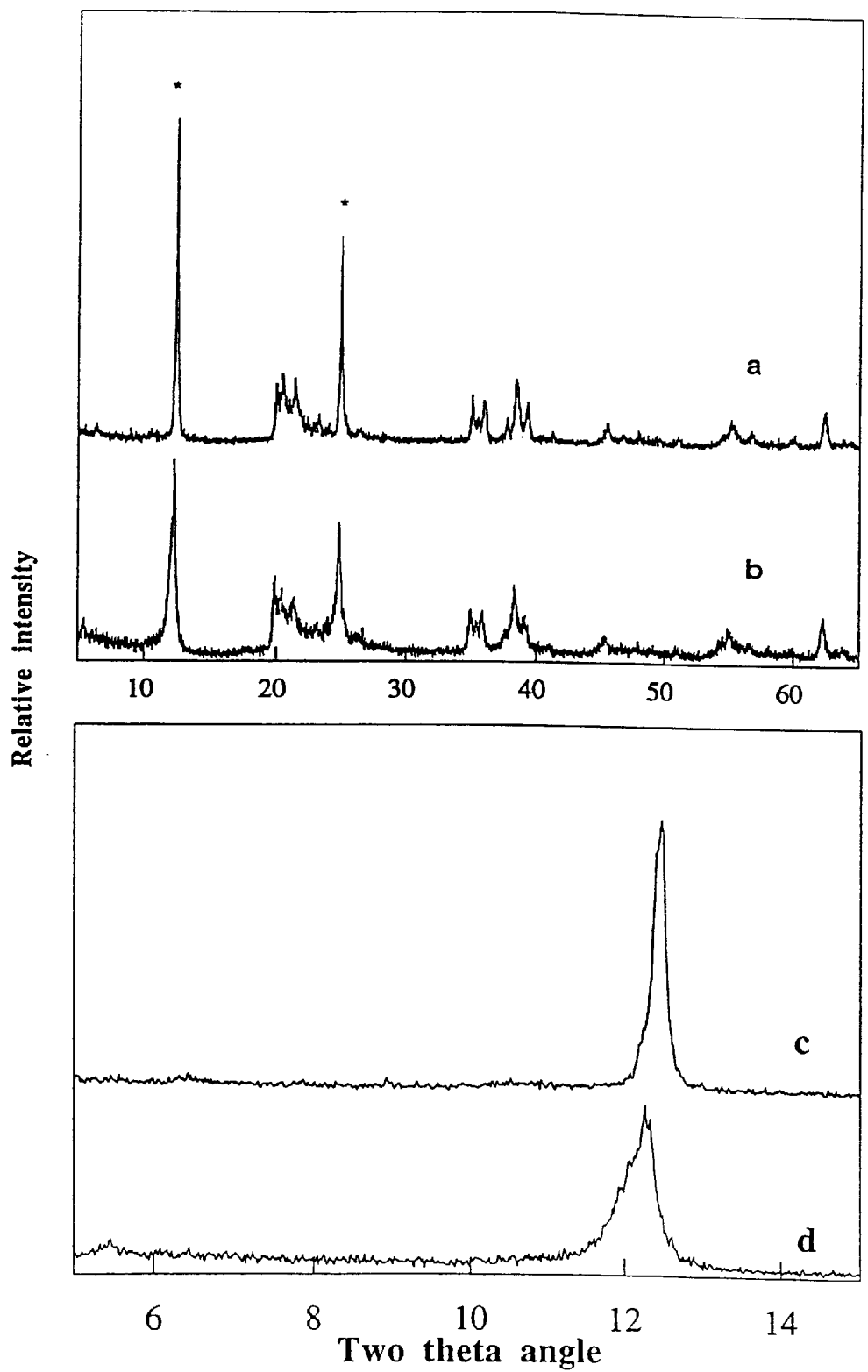
FIG. 4 show powder XRD patterns.
Figure 5:
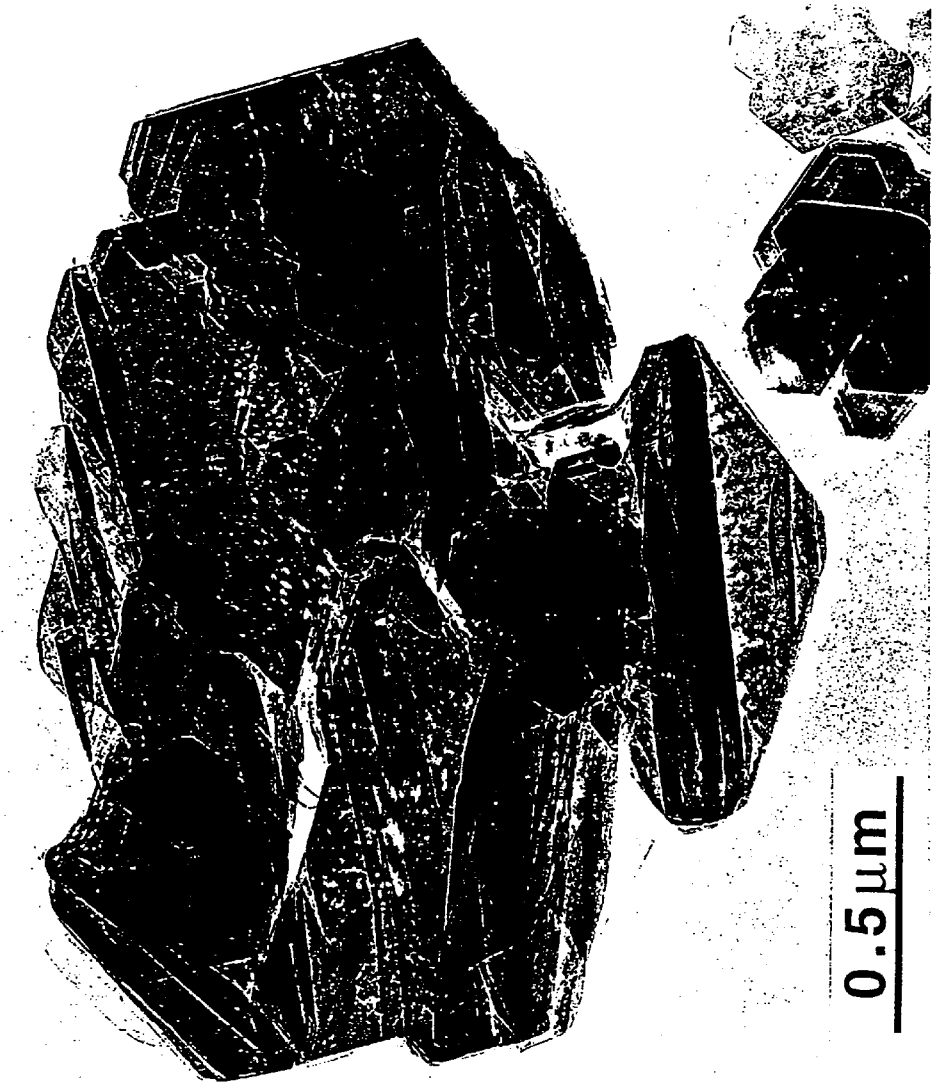
FIG. 5 is a transmission electron micrograph of modified kaolinite as prepared in EXAMPLE 1. The exfoliation of kaolinite layers can be clearly seen.
Figure 9:
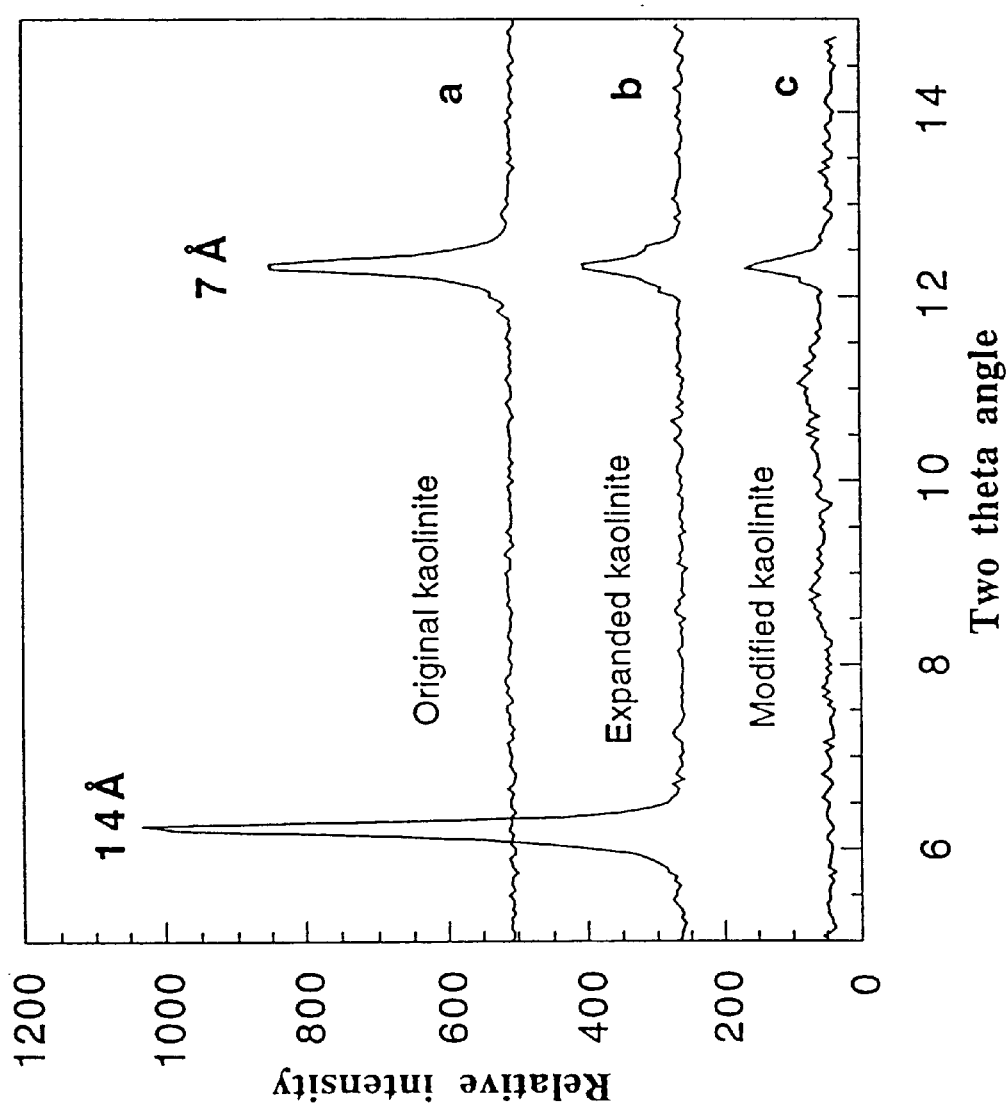
FIG. 9 show XRD traces for basal reflections of original kaolinite, kaolinite intercalated with KAc and modified kaolinite produced after several cycles of intercalation and washing.

FIG. 9 shows the XRD patterns for (i) the original kaolinite; (ii) an expanded kaolinite with intercalated KAc; and (iii) wet modified kaolinite. XRD pattern of dry modified kaolinite along with untreated kaolinite is shown in FIG. 4. TABLE 2 shows summary data for this modified kaolinite prepared using KAc.

Example 2

Preparation of Modified Kaolin using Halloysite and Potassium Acetate Intercalation

Ten grams of halloysite supplied by Commercial Minerals (New Zealand china clay) is thoroughly mixed with 50 ml of saturated solution of KAc in a beaker. The suspension is allowed to intercalate at room temperature for three days or at a higher temperature up to 80° C. (for lesser times) with progress of the intercalation reaction monitored by conventional XRD. After most of the kaolin has expanded, indicated by change of basal spacing from 0.7 nm to 1.4 nm, the suspension is centrifuged and the saturated solution of KAc is removed/decanted. In order to deintercalate the salt, 50 ml of deionized water is added to the clay and thoroughly mixed. The completion of de-intercalation is confirmed by the return of basal spacings to the original value. The suspension is centrifuged again to remove excess water. The clay is then ready for next cycle of intercalation and de-intercalation which is repeated several times.

An intercalation time of 30 minutes in subsequent cycles (rather than 3 days at room temperature for the first intercalation) is usually sufficient for maximum intercalation. Again, progress of an intercalation or de-intercalation step is monitored by the basal spacing of the clay using XRD. Each cycle progressively modifies the layer stacking of kaolinite resulting in increasing readiness for intercalation with each subsequent cycle.

In a sufficiently modified kaolinite which has been subjected to successive cycles (e.g. >20) of intercalation and de-intercalation, the basal spacing is significantly greater than 0.7 nm due to intercalation of water in the modified kaolinite. After the final intercalation/de-intercalation cycle, the sample is thoroughly washed and dried and subjected to a series of characterisation tests.

Figure 10:
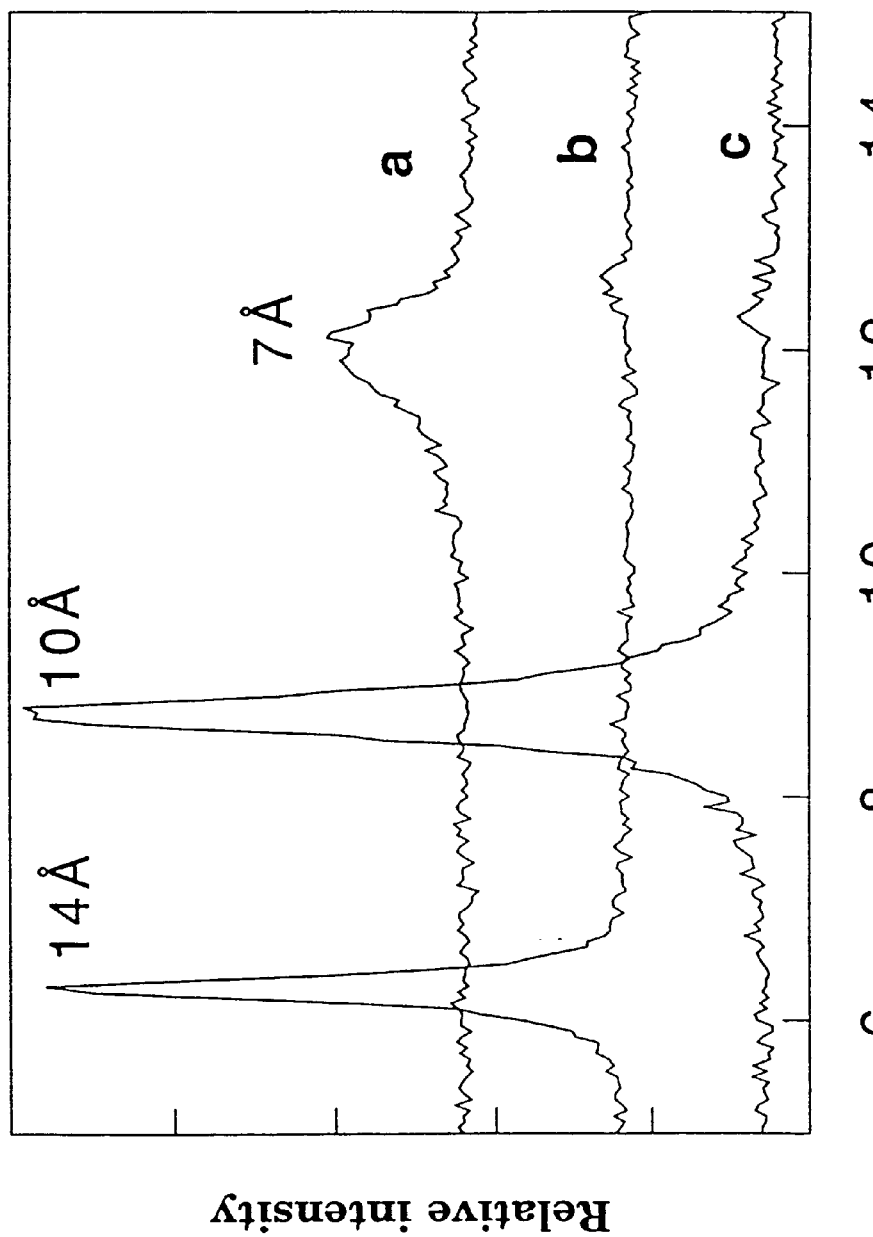
FIG. 10 show XRD traces for basal reflections of original dry halloysite, halloysite intercalated with Kac and modified halloysite produced after several cycles of intercalation and washing.

FIG. 10 shows the XRD patterns for (i) the original kaolinite; (ii) an expanded kaolinite with intercalated Kac; and (iii) the modified kaolinite. TABLE 2 shows summary data for this modified halloysite prepared using KAc as intercalant.

Example 3

Preparation of Modified Kaolin from Kaolinite via Dimethylesulphoxide Intercalation

Ten grams of kaolinite supplied by Commercial Minerals ("Microwhite kaolin") is thoroughly mixed with 50 ml of dimethylesulphoxide (DMSO) containing 8% water. The suspension is allowed to intercalate at room temperature for three days or at a higher temperature up to 80° C. (for lesser times) with progress of the intercalation reaction monitored by conventional XRD. After most of the kaolin has expanded, indicated by change of basal spacing from 0.7 nm to 1.4 nm, the suspension is centrifuged and the DMSO solution is removed/decanted. In order to effect de-intercalation, 50 ml of deionized water is added to the clay and thoroughly mixed. The completion of de-intercalation is confirmed by the return of the basal spacing to the original value of 0.7 nm. The suspension is centrifuged again to remove excess water. The clay is then ready for the next cycle of intercalation and de-intercalation which is repeated many times.

An intercalation time of 30 minutes in subsequent cycles is usually sufficient for maximum intercalation. Again, progress of an intercalation or de-intercalation step is monitored by the basal spacing of the clay using XRD. Each cycle progressively modifies the layer stacking of kaolinite resulting in increasing readiness for intercalation with each subsequent cycle.

In a sufficiently modified kaolinite which has been subjected to successive cycles (e.g. >20) of intercalation and de-intercalation, the basal spacing is significantly greater than 0.7 nm due to intercalation of water in the modified kaolinite. After the final intercalation/de-intercalation cycle, the sample is thoroughly washed and dried and subjected to a series of characterisation tests.

An XRD pattern similar to that shown in FIG. 4 is produced for the modified kaolinite formed by this method. TABLE 2 shows summary data for this modified kaolinite using DMSO as intercalant.

Example 4

Conversion of Modified Kaolinite to an Amorphous-silicate Derivative

The sample prepared by the final intercalation step outlined in EXAMPLE 1 is heated at 550° C. for one hour. The resulting powder shows a characteristic amorphous trace using XRD and shows an increased CEC value (using the 1M NH$_4$Cl exchange method) over the value for a modified kaolinite as formed in EXAMPLE 1 and a significantly increased CEC value compared to the starting kaolinite.

TABLE 2 details the surface area and CEC values for this modification compared with the starting kaolinite.

Example 5

Absorption of Water by Modified Kaolinite-comparison with Kaolins.

Five grams of oven dried modified kaolin and untreated kaolins were wetted with excess deionized water. The resulting slurry was centrifuged at 3000 rpm for 15 minutes to remove superfluous water (i.e. water not retained by the material). The water content of sedimented material was determined gravimetrically and is presented as percent water absorbed for each sample. In each case, the modified kaolin shows a higher level of water absorption than original starting kaolin. A similar capacity for increased absorption of oils and organic molecules can be expected for these modified kaolinites.

Example 6

Conversion of Modified Kaolinite to CaCl$_2$-intercalated Form

A 5 g sample of kaolinite from Georgia USA (Source Clay KGa-1) is converted to a modified kaolin via intercalation of KAc as demonstrated in EXAMPLE 1. After formation of the KAc-kaolinite intercalate, it is washed with saturated CaCl$_2$ solution and characterised using powder XRD.

Figure 6:
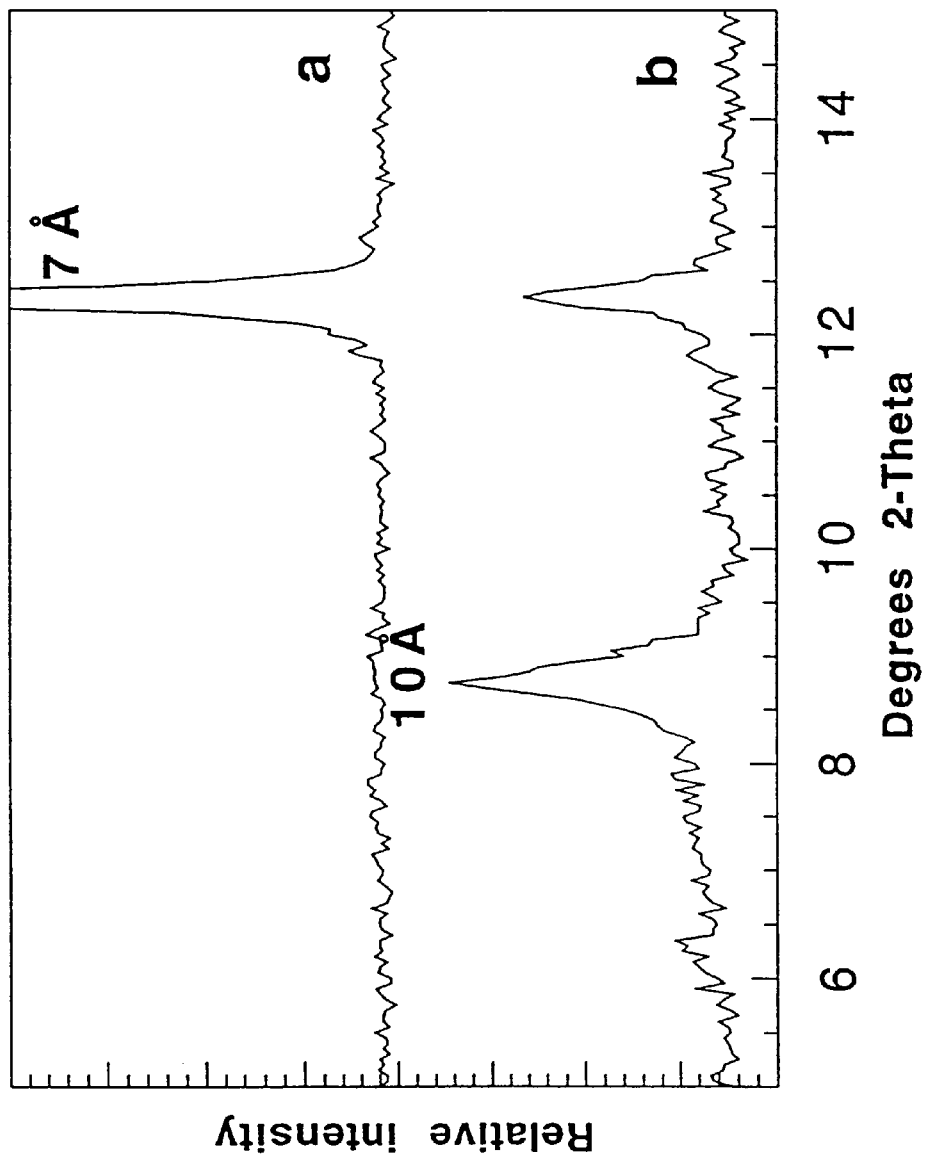
FIG. 6 show XRD traces for kaolinite and modified kaolinite after treatment with saturated solutions of $CaCl_2$.

An example of powder XRD traces for the sample after washing with CaCl$_2$ and after washing again with water (to remove CaCl$_2$) is given in FIG. 6.

Example 7

Conversion of Modified Kaolinite to MgCl$_2$-intercalated Form

A 5 g sample of kaolinite from Georgia USA (Source Clay KGa-1) is converted to a modified kaolin via intercalation of KAc as demonstrated in EXAMPLE 1. After formation of the KAc-kaolinite intercalate, it is washed with saturated MgCl$_2$ solution and characterised using powder XRD.

Figure 7:
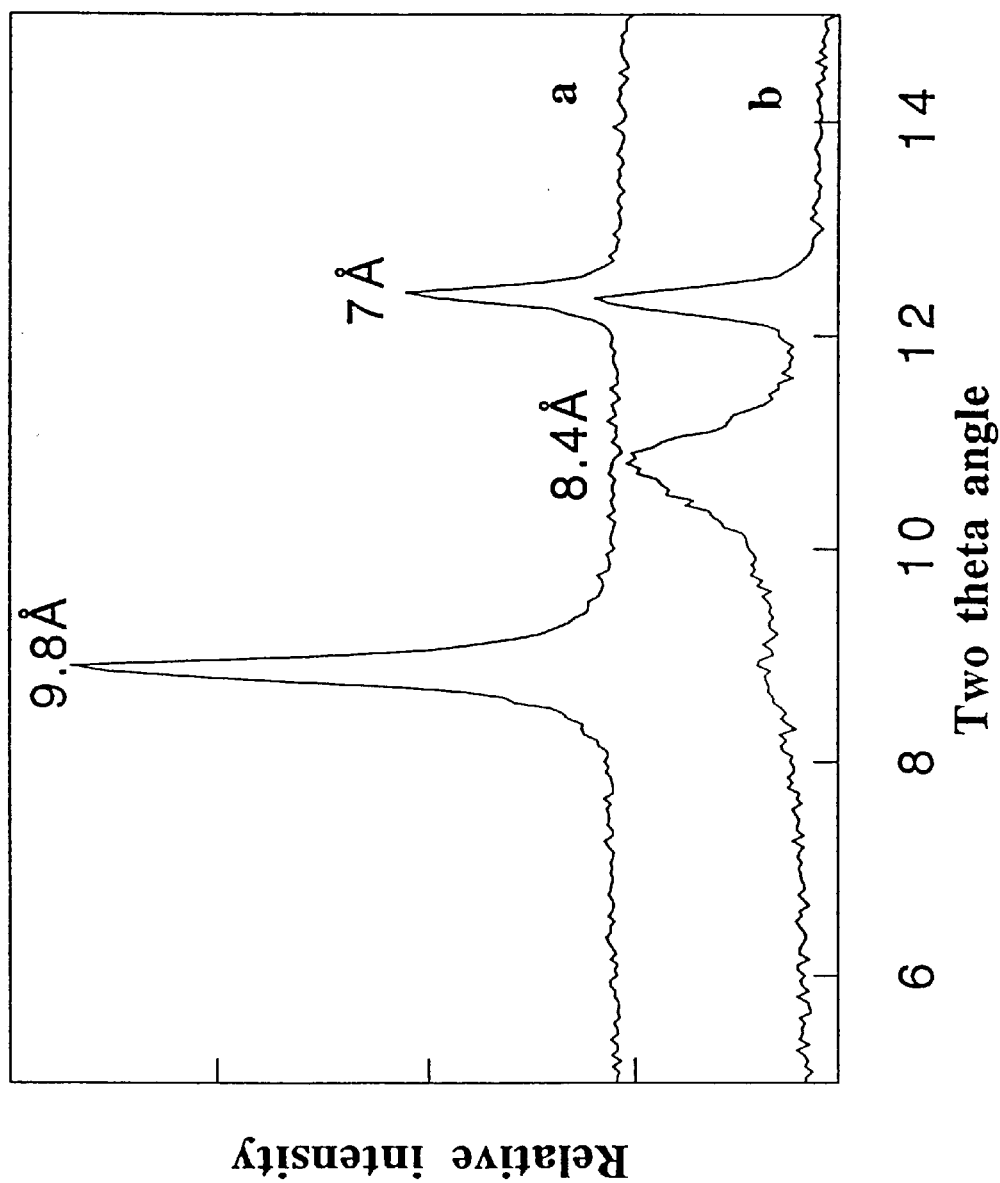
FIG. 7 show XRD traces for modified kaolinite washed with saturated solution of $MgCl_2$ and modified kaolinite washed with water to remove intercalated $MgCl_2$.
Figure 8:
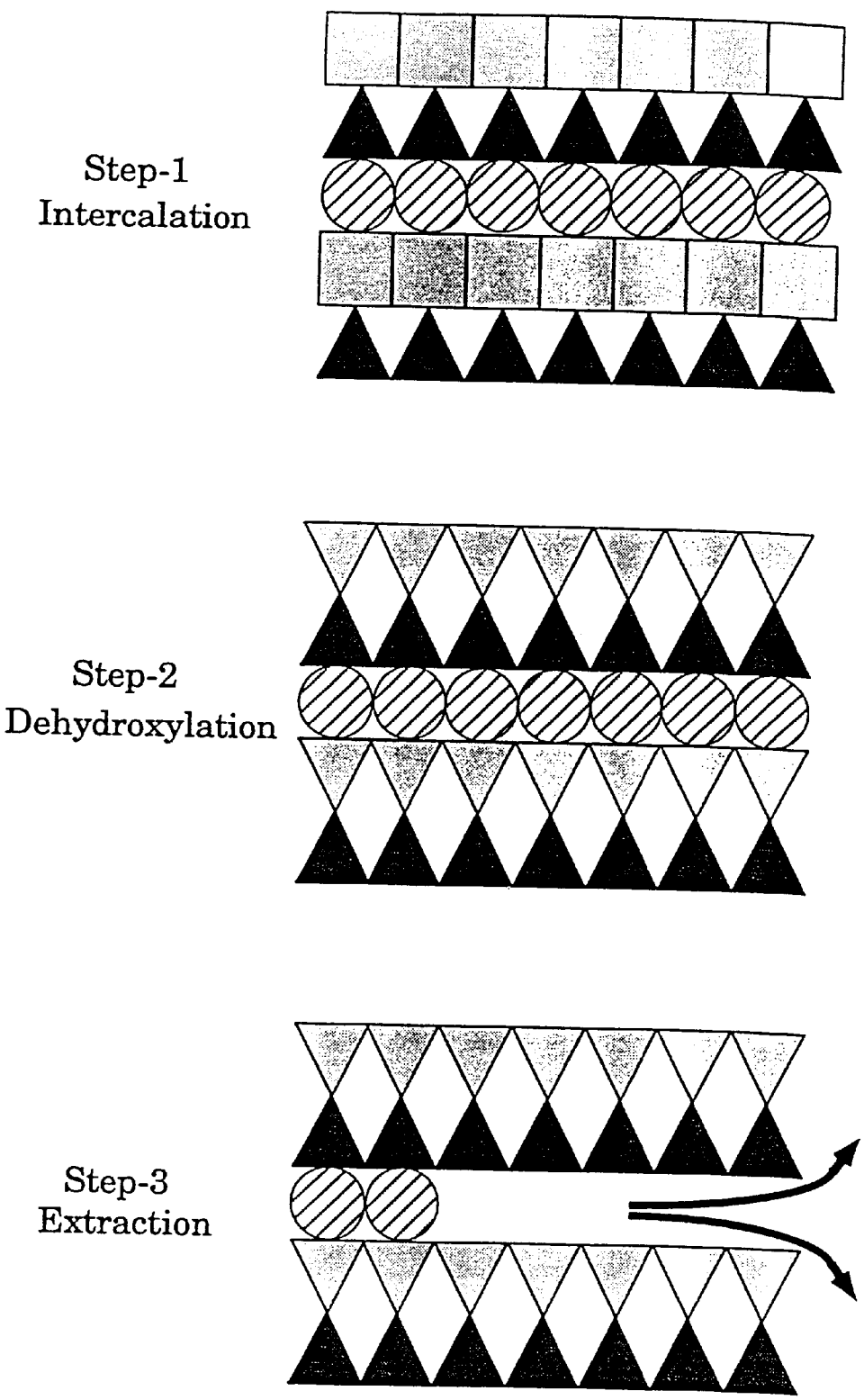
FIG. 8 is a schematic diagram illustrating the major processing steps in preparation of the porous materials from modified kaolin clays.

An example of powder XRD traces for the sample after washing with MgCl$_2$ and after washing again with water (to remove MgCl$_2$) is given in FIG. 7.

Example 8

Figure 11:
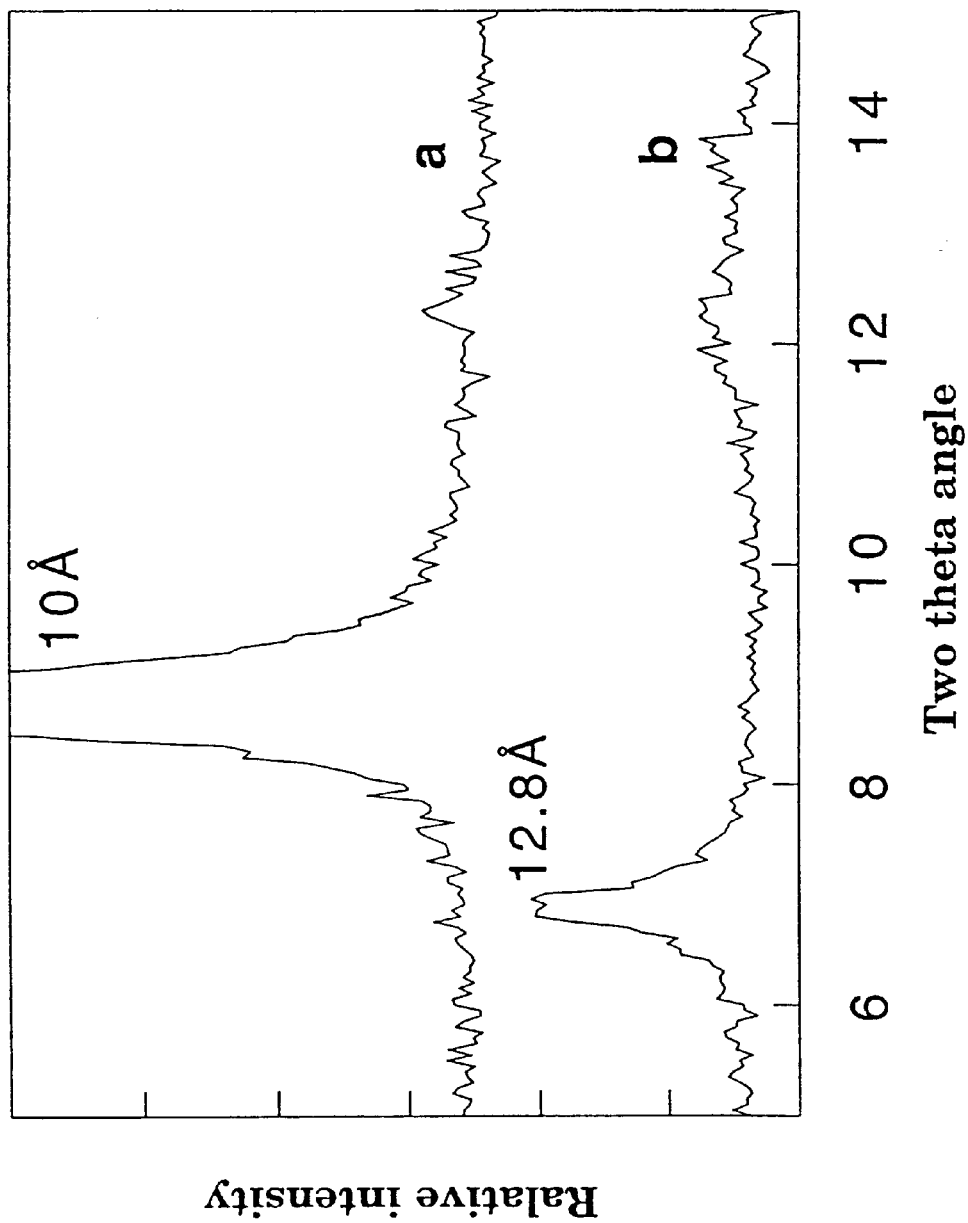
FIG. 11 show XRD traces for modified halloysite and modified halloysite washed with saturated solution of $CaCl_2$.

Conversion of Halloysite to Modified Halloysite and Subsequent Intercalation of CaCl$_2$ A 10 g sample of New Zealand china clay (halloysite HNZ) is converted to a modified kaolin via intercalation of KAc as demonstrated in EXAMPLE 2. The modified halloysite, kept wet after its preparation, is then washed twice with a saturated solution of CaCl$_2$. The modified halloysite readily intercalates CaCl$_2$ as demonstrated by the expansion of the layer to 1.4 nm (FIG. 11).

Example 9

Figure 12:
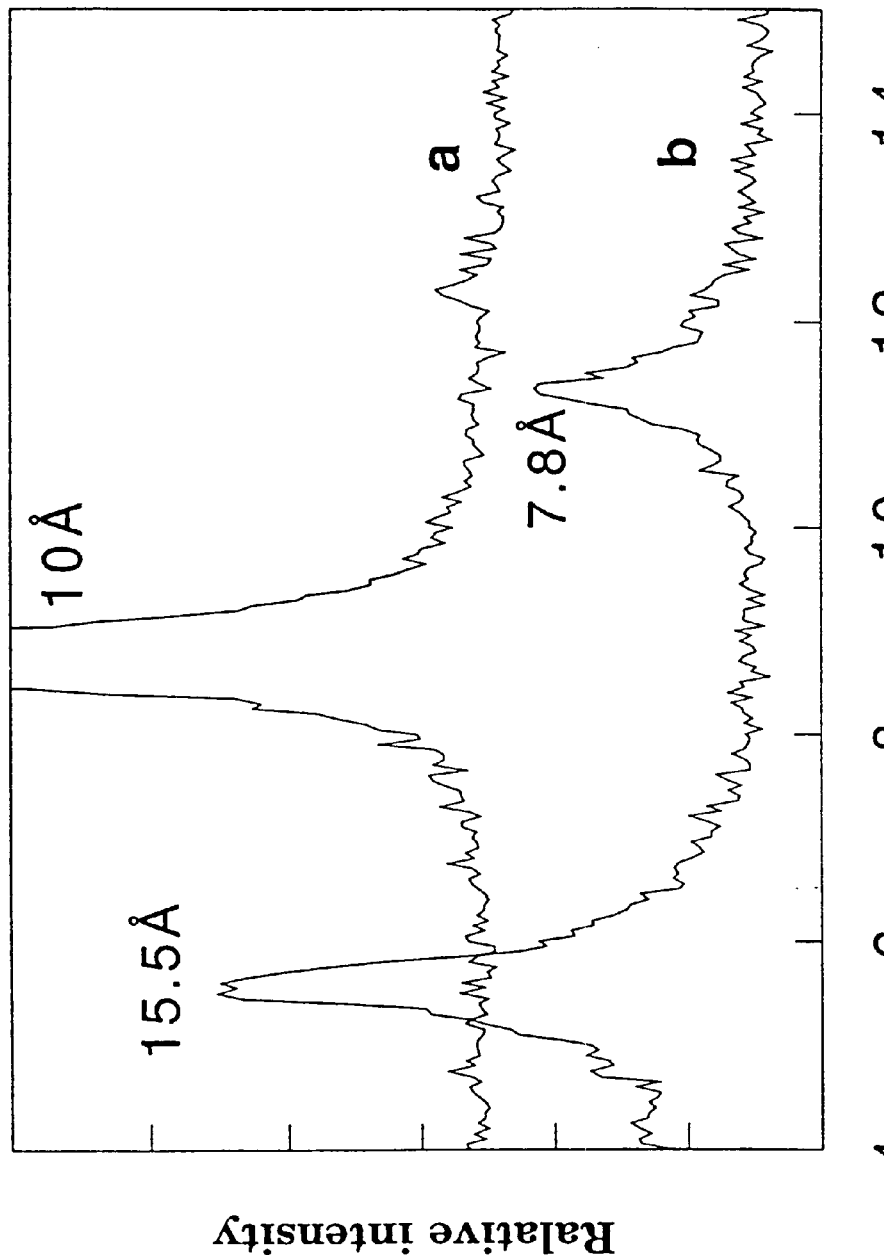
FIG. 12 show XRD traces for modified halloysite and modified halloysite washed with saturated solution of $MgCl_2$.

Conversion of Halloysite to Modified Halloysite and Subsequent Intercalation of MgCl$_2$ A 10 g sample of New Zealand china clay (halloysite HNZ) is converted to a modified kaolin via intercalation of KAc as demonstrated in EXAMPLE 2. The modified halloysite, kept wet after its preparation, is then washed twice with a saturated solution of MgCl$_2$. The modified halloysite readily intercalates MgCl$_2$ as demonstrated by the expansion of the layer to 1.4 nm (FIG. 12).

Example 10

Preparation of Ca Loaded Alumino Silicate Material

A 5 g sample of modified halloysite prepared as in EXAMPLE 2 is intercalated with a saturated solution of CaCl$_2$ as described in EXAMPLE 8. The kaolin- CaCl$_2$ intercalate so prepared is then dried at 80° C. before it is heated at 550° C. for one hour. The sample is then allowed to cool before washing the powder until all soluble salt is removed. The resulting white powder retains the inserted Ca in the structure of the dehydroxylated material.

Figure 13:
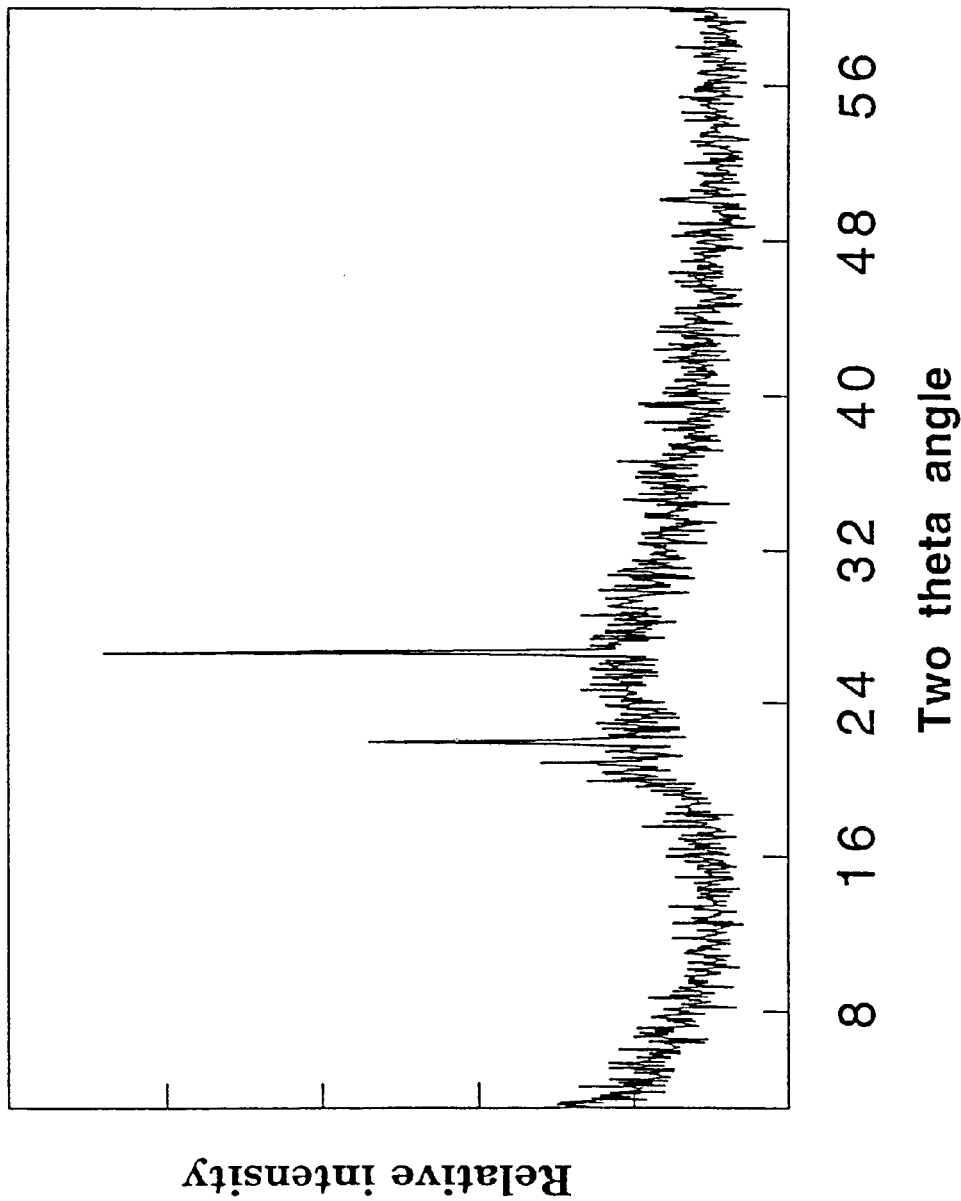
FIG. 13 is an XRD trace of Ca-loaded alumino silicate material.

The chemical composition of this material is given in TABLE 4 and an XRD trace is given in FIG. 13.

Example 11

Preparadon of Mg Loaded Alumino Silicate Material

A 5 g sample of modified halloysite prepared as in EXAMPLE 2 is inter described in EXAMPLE 9. The kaolin-MgCl$_2$ intercalate so prepared is then dried at 80° C. before it is heated at 550° C. for one hour. The sample is then allowed to cool before washing the powder until all soluble salt is removed. The resulting white powder retains the inserted Mg in the structure of the dehydroxylated material.

Figure 14:
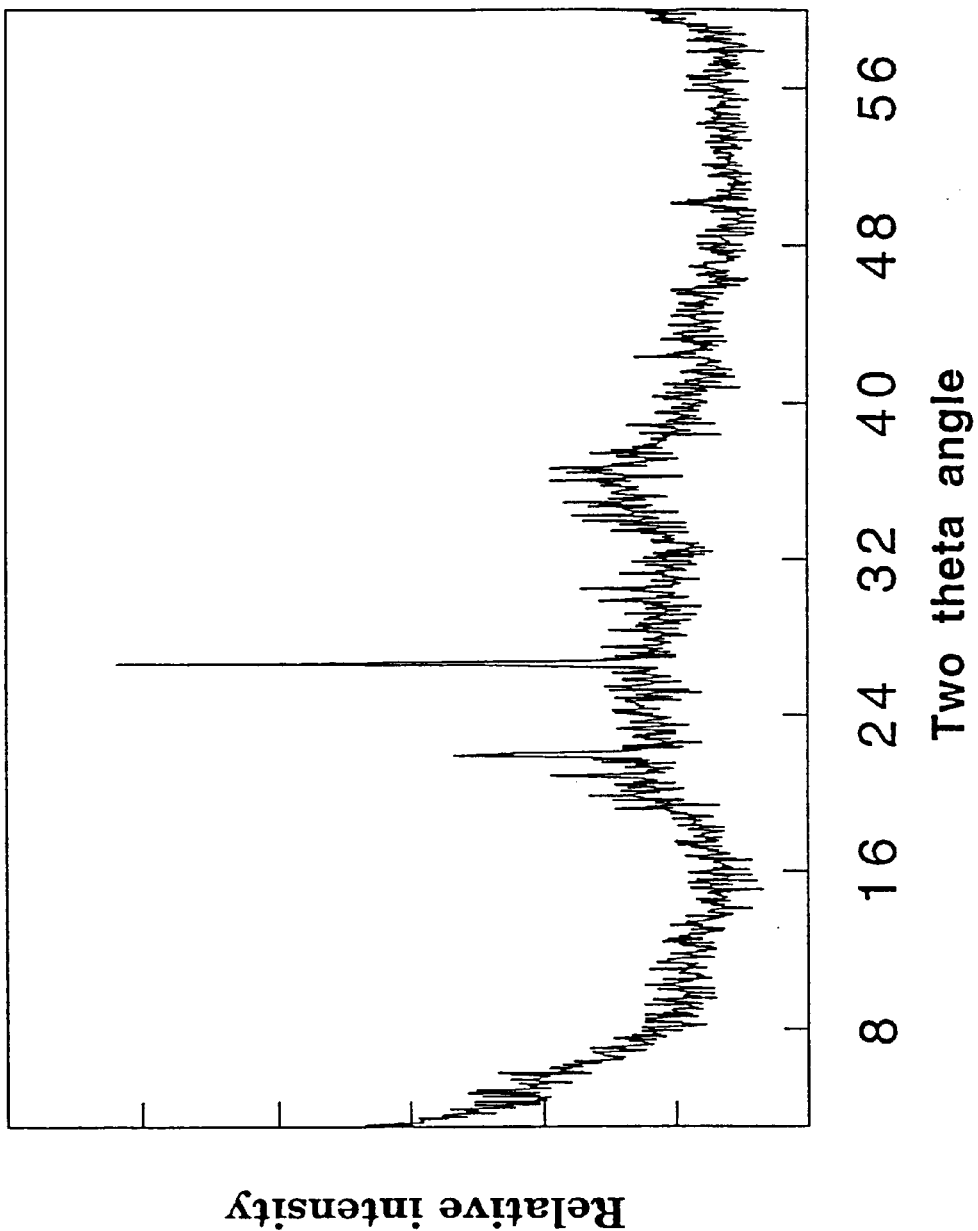
FIG. 14 is an XRD trace of Mg-loaded alumino silicate material.

The chemical composition of this material is given in TABLE 4 and an XRD trace is given in FIG. 14.

Example 12

Preparation of Porous Material using Modified Kaolin-CaCl2-intercalate

Figure 15:
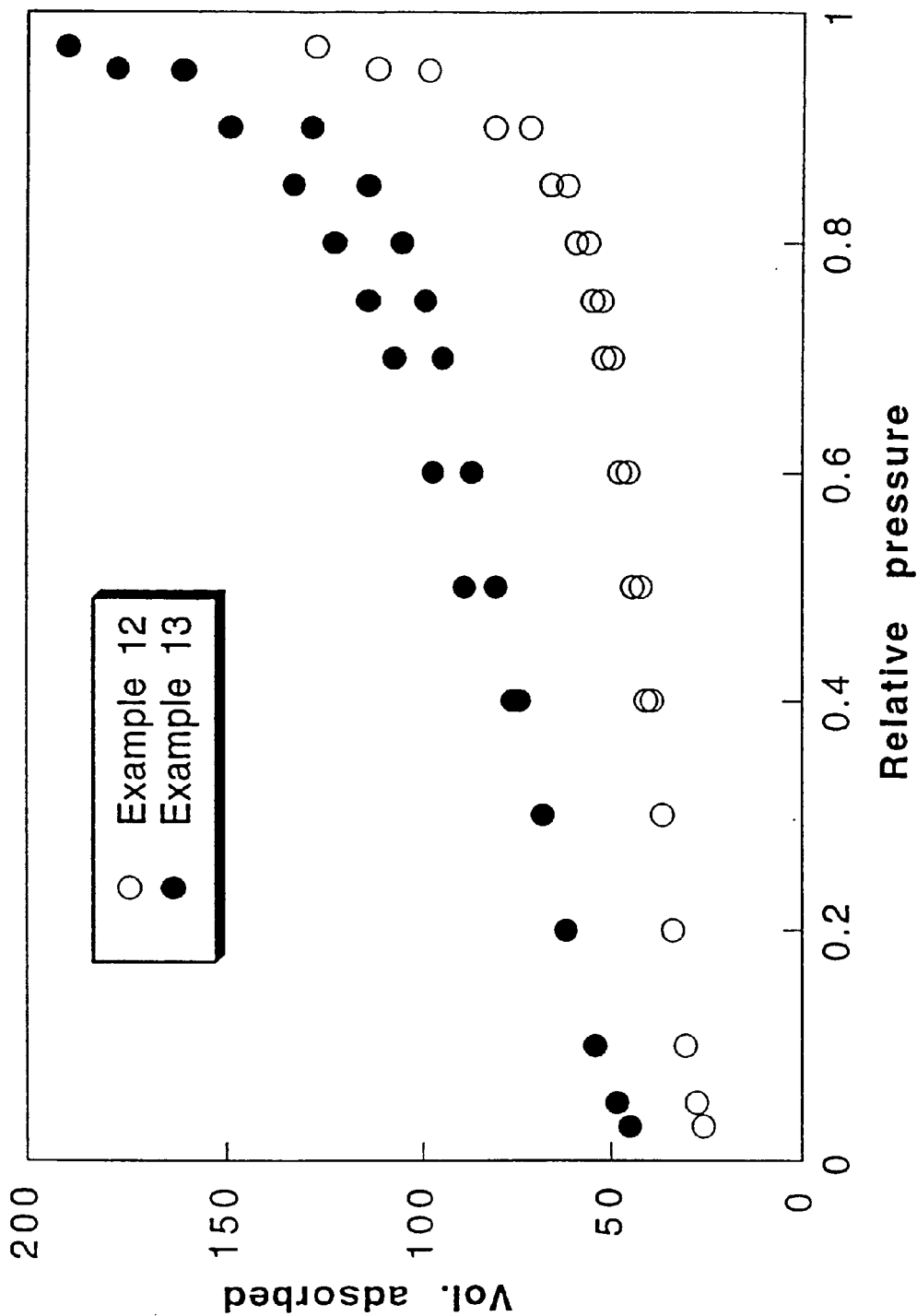
FIG. 15 is a $N_2$ BET full isotherm of microporous materials prepared following EXAMPLES 12 and 13.

A 10 g sample of halloysite is converted to modified halloysite and then intercalated with CaCl$_2$ according to the procedure outline in EXAMPLE 8. The intercalated material is then dehydroxylated and washed as in EXAMPLE 10. This material is then mixed with 40 ml of 0.5 M HCl. The contents were then allowed to react for two hours while being stirred at room temperature. Next, the contents are centrifuged and supernatant discarded. The solid material is washed several times with deionized water and then dried at 105° C. The final product has a surface area of 110 m$^2$/g and CEC of 52 meq/100 g. The material has a significant microporosity as demonstrated by N$_2$ BET isotherm which is of Type 1 (FIG. 15). An unmodified halloysite given the same acid activation treatment has a surface area and CEC values of 24 m$^2$/g and 5 meq/100 g, respectively.

Example 13

Figure 16:
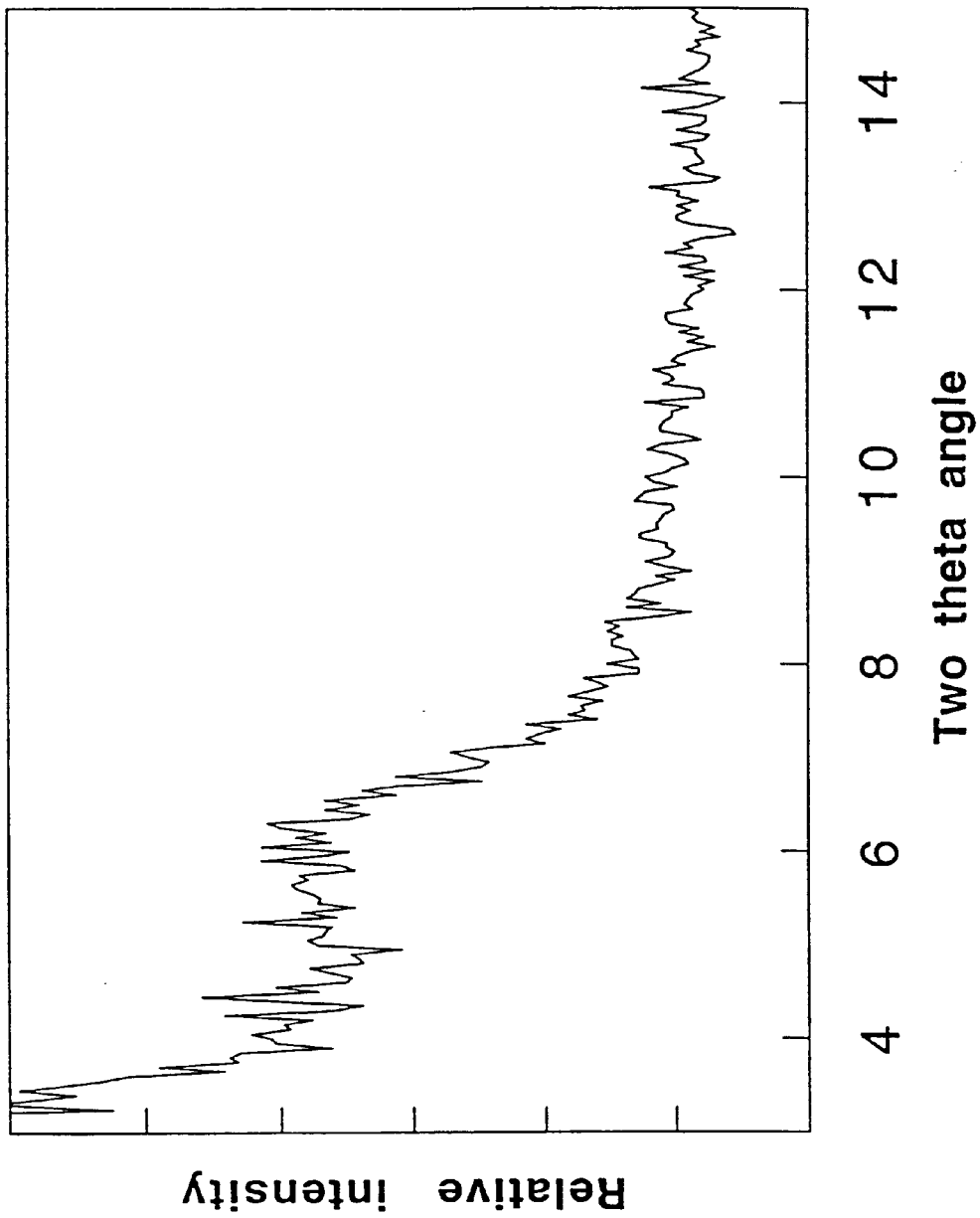
FIG. 16 is an XRD trace of porous material prepared via $MgCl_2$-intercalation, dehydroxylation and acid extraction as outlined in EXAMPLE 13.

Preparadon of Porous Material using the Modified Kaolin-MgCl$_2$ Intercalate and HCl A 10 g sample of halloysite is converted to modified halloysite and then intercalated with MgCl$_2$ according to the procedure outline in EXAMPLE 9. The intercalated material is then dehydroxylated and washed as in EXAMPLE 11. This material is then mixed with 40 ml of 0.5 M HCl. The contents are then allowed to react for two hours while being stirred at room temperature. Next, the contents are centrifuged and supernatant discarded. The solid material is washed several times with deionized water and then dried at 105° C. The final product has a surface area of 205 m²/g and CEC of 67 meq/100 g. The materials has a significant microporosity as demonstrated by $N_2$ BET isotherm which is of Type 1 (FIG. 15) and XRD trace FIG. 16 showing a broad diffraction peak at ~15 Å.

An unmodified halloysite given the same treatment has a surface area and CEC values of 24m²/g and 5 meq/100 g, respectively.

Example 14

Preparation of Porous Material using the Modified Kaolin-$MgCl_2$ Complex and Acetic Acid A 10 g sample of halloysite is converted to modified halloysite and then intercalated with $MgCl_2$ according to the procedure outlined in EXAMPLE 9. The intercalated material is then dehydroxylated and washed as in EXAMPLE 11. This material is then mixed with 40 ml of 1 M acetic acid. The contents are then allowed to react for two hours while being stirred at room temperature. Next, the contents are centrifuged and supernatant discarded. The solid material is washed several times with deionized water and then dried at 105° C. The final product has a surface area of 267 m²/g. The materials showed a $N_2$ BET isotherm which is of Type 1 and XRD trace similar to that shown in FIG. 16.

Example 15

Preparation of Cu-load Alumino Silicate

Figure 17:
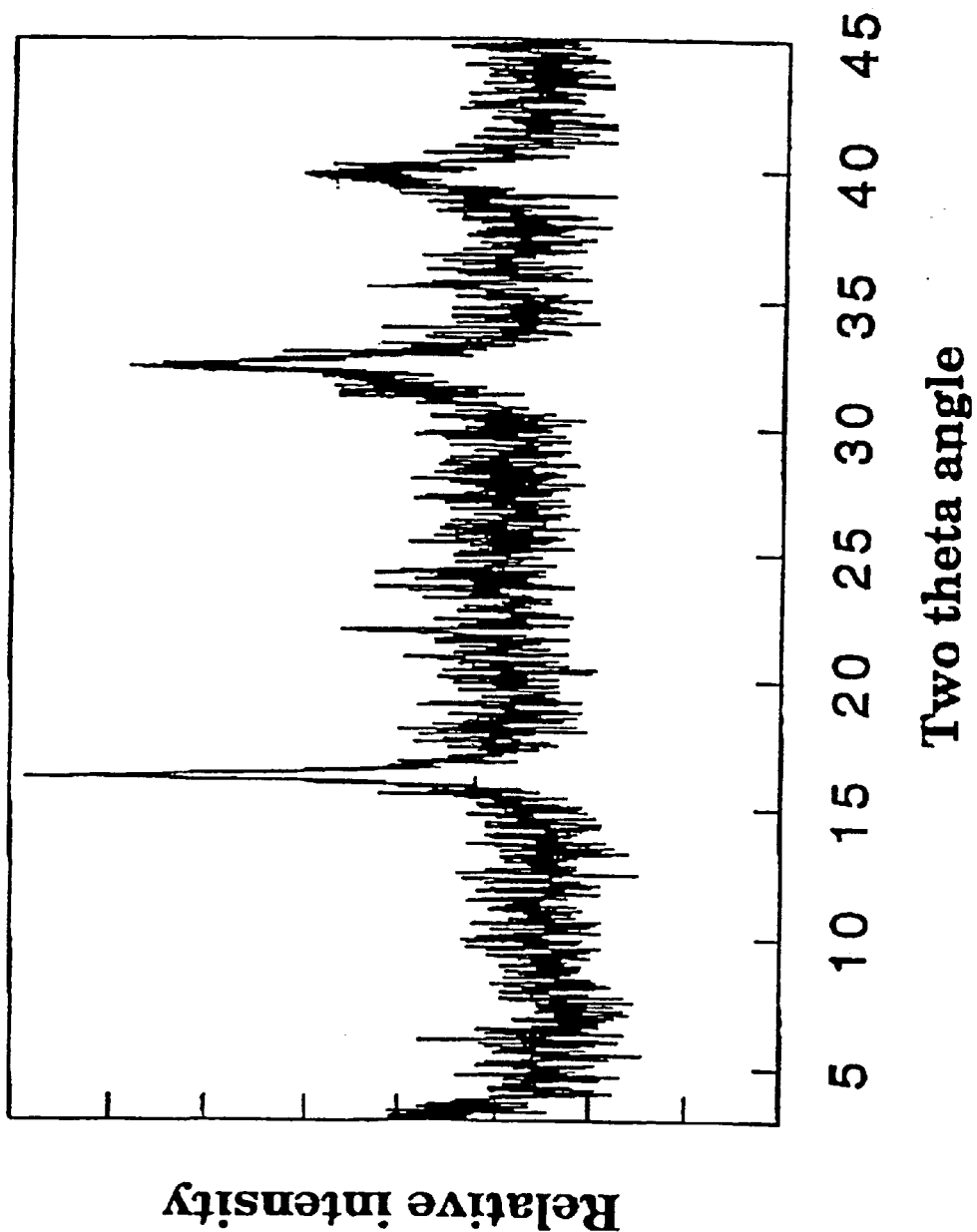
FIG. 17 is an XRD trace of Cu-loaded alumino silicate material.

A 10 g sample of halloysite is converted to modified halloysite according to procedure outlined in EXAMPLE 2. The modified kaolin is then intercalated with saturated solution $CuCl_2$ at 100° C. for 3 days. After intercalation, the free $CuCl_2$ solution is removed. The intercalated material is dried and then heated at 550° C. for 1 hour. The product is then washed and analysed for Cu content, surface area and crystallinity. The final product contains 25.9% CuO and shows an XRD pattern as presented in FIG. 17. A similarly processed unmodified halloysite retained no or little Cu.

TABLES

TABLE 1

Crystallographic data for untreated and modified kaolinite prepared as in EXAMPLE 1.

| | UNTREATED KAOLINITE | | | MODIFIED KAOLINITE | | |
|---|---|---|---|---|---|---|
| hkl | d (Å) | FWHM | I/I | d (Å) | FWHM | I/I |
| 001 | 7.11 | 0.219 | 100 | 7.17 | 0.57 | 100 |
| 020 | 4.44 | 2.25 | 31 | 4.44 | — | 25 |
| 110 | 4.34 | — | 37 | 4.34 | — | 24 |
| 11$\bar{1}$ | 4.16 | 0.35 | 28 | 4.16 | — | 19 |
| 02$\bar{1}$ | 3.83 | — | 13 | 3.852 | — | 10 |
| 002 | 3.56 | 0.24 | 76 | 3.56 | 0.35 | 91 |
| 111 | 3.36 | — | 7 | 3.36 | — | 7 |
| 13$\bar{0}$ | 2.56 | 0.361 | 20 | 2.56 | 0.432 | 17 |
| 13$\bar{1}$ | 2.52 | — | 15 | 2.52 | — | 12 |
| 13$\bar{2}$ | 2.49 | 0.337 | 23 | 2.49 | 0.418 | 16 |
| 003 | 2.38 | — | 9 | 2.37 | — | 10 |
| 13$\bar{1}$ | 2.33 | 0.406 | 32 | 2.34 | 0.55 | 25 |
| 131 | 2.29 | — | 19 | 2.29 | — | 14 |
| 20$\bar{3}$ | 1.99 | 0.54 | 8 | 1.99 | 0.676 | 8 |

TABLE 1-continued

Crystallographic data for untreated and modified kaolinite prepared as in EXAMPLE 1.

| | UNTREATED KAOLINITE | | | MODIFIED KAOLINITE | | |
|---|---|---|---|---|---|---|
| hkl | d (Å) | FWHM | I/I | d (Å) | FWHM | I/I |
| 13$\bar{3}$ | 1.66 | — | 12 | 1.66 | — | 11 |
| 33$\bar{1}$ | 1.49 | 0.39 | 19 | 1.49 | 0.467 | 15 |

TABLE 2

Averaged microprobe analyses for untreated kaolinite and modified kaolinite prepared as outlined in EXAMPLE 1.

| ELEMENT WT % OXIDE | MODIFIED KAOLINITE | UNTREATED KAOLINITE |
|---|---|---|
| $Na_2O$ | 0.01 | .01 |
| $N_2O$ | 1.2 | .01 |
| $Al_2O_3$ | 35.8 | 35.2 |
| $SiO_2$ | 50.0 | 49.7 |
| $Fe_2O_3$ | 0.8 | 0.9 |
| TOTAL | 87.8 | 85.8 |

TABLE 3

Summary of properties for selected modifications of kaolinite

| SAMPLE | SURFACE AREA (m²/g) | CEC (meq/100 g) |
|---|---|---|
| Untreated kaolins | | |
| KCM kaolinite (untreated) | 24 | 37 |
| KGa-1 kaolinite (untreated) | 10 | 25 |
| HNZ halloysite (untreated) | 21 | 33 |
| Modified kaolins | | |
| KCM Example 1 | 23 | 87 |
| HNZ Example 2 | 21 | 73 |
| KGa-Example 3 | 12 | 91 |
| KCM Example 4 | 18 | 242 |
| Comparative Data | | |
| Metakaolin | 10 | 28 |
| Calcined kaolin | 21 | 5 |

TABLE 4

Relative absorption of water for modified kaolins

| SAMPLE | WATER ABSORPTION (%) |
|---|---|
| KCM kaolinite (untreated) | 106 |
| HNZ halloysite (untreated) | 58 |
| Modified kaolins | |
| KCM Example 1 | 212 |
| HNZ Example 1 | 205 |

TABLE 5

Averaged microprobe analyses for metal impreganted modified kaolins

| ELEMENT WT % OXIDE | Ca-INTERCALATE | Mg-INTERCALATE |
|---|---|---|
| CaO | 10.60 | — |
| MgO | — | 20.08 |
| Na$_2$O | — | — |
| K$_2$O | 2.44 | 3.19 |
| Al$_2$O$_3$ | 34.17 | 27.87 |
| SiO$_2$ | 47.97 | 39.71 |
| Fe$_2$O$_3$ | 0.30 | 0.26 |
| TOTAL | 95.48 | 91.11 |

Legends

FIG. 3

$C_0$ represent the concentration at which all clay is deintercalated and $C_{100}$ represents the intercalant concentration at which all clay is intercalated.

FIG. 4

Powder XRD patterns for (a) standard kaolinite (KGa-1) and (b) dry modified kaolinite prepared as outlined in Example 1. The modified kaolinite shows well resolved basal and hk reflections. The (00) reflections of modified kaolinite, marked by asterisk and (001) enlarged in (d) are significantly broader than corresponding reflections of untreated kaolinite (c).

FIG. 6

XRD traces for (a) kaolinite and (b) modified kaolinite after treating with saturated solution of CaCl$_2$. Modified kaolinite expands to form CaCl$_2$ intercalate, indicated by appearance of a refection at 8.7° two theta angle (~10 Å), and reduction in intensity of 12.4° reflection whereas layer spacings of kaolinite remains unchanged at 7 Å indicated by strong reflection at 12.4° two theta angle.

FIG. 7

XRD traces for (a) modified kaolinite washed with saturated solution of MgCl$_2$ and (b) modified kaolinite washed with water to remove intercalated MgCl$_2$. Modified kaolinite has intercalated MgCl$_2$ intercalate, indicated by appearance of a refection at 8.7° two theta angle (~10 Å), whereas raw kaolinite similarly treated showed XRD trace similar to FIG. 6A.

FIG. 9

XRD traces for basal reflections of (a) original kaolinite, (b) kaolinite intercalated with KAc and (c) modified kaolinite produced after several cycles of intercalation and washing. Original kaolinite has a layer spacing of 7 Å, expands to about 14 Å after intercalation with KAc and returns to 7 Å after washing the KAc. After several cycles of expansion and contraction, kaolinite spacing does not return to 7 Å. A residual peak at 7 Å represents kaolinite which is not affected by this treatment.

FIG. 10

XRD traces for basal reflections of (a) original dry halloysite, (b) halloysite intercalated with KAc and (c) modified halloysite produced after several cycles of intercalation and washing.

FIG. 11

XRD traces for (a) modified halloysite and (b) modified halloysite washed with saturated solution of CaCl$_2$ Intercalation of modified halloysite with CaCl$_2$ is indicated by expansion of layers.

FIG. 12

XRD traces for (a) modified halloysite and (b) modified halloysite washed with saturated solution of MgCl$_2$ Intercalation of modified halloysite with MgCl$_2$ is indicated by expansion of layers from 10 Å to 15.5 Å.

FIG. 13

XRD traces of Ca impregnated kaolin composition. The material is largely amorphous. The sharp reflections belong to quartz which occur as impurity in the starting material.

FIG. 14

The material is largely amorphous. The sharp reflections belong to quartz which occur as impurity in the starting material.

FIG. 15

The isotherms are classified as Type 1 indicating significant microporosity.

FIG. 16

A broad reflection at about 6° two theta angle demonstrates the presence of micropores.

We claim:

1. A process for the preparation of a modified kaolin from a kaolin group mineral comprising repeatedly expanding and contracting the layers of the kaolin group mineral, said layers comprising one Si-tetrahedral sheet and one Al-octahedral sheet to form a modified kaolin, which is not an intercalate, said modified kaolin also having a greater intercalation capacity than a kaolin which has not undergone repeated expansion and contraction.

2. A process as claimed in claim 1 wherein said repeated expansion and contraction of the layers comprises 10–60 cycles.

3. A process as claimed in claim 1 wherein the repeated expansion and contraction of the layers comprises 2–10 cycles.

4. A process as claimed in claim 1 wherein the repeated expansion and contraction of the layers comprises 20–60 cycles.

5. A process as claimed in claim 1 wherein said repeated expansion and contraction is initiated by initial intercalation of a reagent which can penetrate kaolin layers to reach an interlayer region therebetween to form an intercalate.

6. A process as claimed in claim 5 wherein the reagent is a polar molecule.

7. A process as claimed in claim 6 wherein the polar molecule is selected from potassium acetate, dimethyl sulfoxide or N-methyl formamide.

8. A process as claimed in claim 5 wherein the intercalation is effected by grinding the kaolin group mineral with a solid reagent.

9. A process as claimed in claim 5 wherein the intercalation is carried out by exposing the kaolin group mineral to vapors of volatile compounds.

10. A process as claimed in claim 5 wherein the intercalation is followed by deintercalation which involves removal of the reagent.

11. A process as claimed in claim 10 wherein the deintercalation is effected by washing the intercalate with water in the case where the reagent is soluble in water.

12. A process as claimed in claim 10 wherein the reagent is removed by heating of the intercalate in air.

13. A process as claimed in claim 10 wherein the reagent is removed by dilution of the reagent to a concentration lower than a concentration where most of the kaolin deintercalates ($C_0$).

14. A process as claimed in claim 10 wherein the procedure of intercalation and deintercalation is repeated without washing of the intercalate.

15. A process as claimed in claim 14 wherein the kaolin group mineral is mixed with a solution of reagent in water and the concentration of reagent is gradually increased by addition of solid reagent until the reagent's concentration exceeds a concentration at which the kaolin is fully intercalated ($C_{100}$).

16. A process as claimed in claim 15 wherein the reagent concentration is mixed to a level at which most of the kaolin group mineral expands.

17. A process as claimed in claim 15 wherein after complete intercalation has occurred, the concentration of the reagent is gradually decreased below the $C_{100}$ concentration by adding water to the mixture with mild agitation.

18. A process as claimed in claim 17 wherein the concentration of the reagent is reduced to a concentration where most of the kaolin deintercalates.

19. A process as claimed in claim 18 wherein intercalation again takes place by heating of the mixture to remove excess water and raise the concentration of reagent above the $C_{100}$ concentration.

20. A process as claimed in claim 19 wherein the reagent concentration is varied between a concentration where most of the kaolin deintercalates ($C_0$) to a concentration above the $C_{100}$ concentration by addition and removal of the reagent by heating.

21. A process as claimed in claim 5 wherein the modified kaolin is subjected to intercalation with a metal salt to form said intercalate.

22. A process as claimed in claim 21 wherein the metal salt is a salt of a divalent cation.

23. A process as claimed in claim 22 wherein the metal salt is a magnesium, calcium or copper salt.

24. A process as claimed in claim 21 wherein the intercalate is subsequently heated to between 300–900° C. to dehydroxylate the intercalate.

25. A process as claimed in claim 24 wherein the temperature is 550° C.

26. A process as claimed in claim 24 wherein the intercalate after heating is washed to remove excess reagent and any other byproduct or contaminant.

27. A process as claimed in claim 26 wherein inserted metal ions are extracted from the intercalate by reaction with an acid to form a microporous material.

28. A process as claimed in claim 27 wherein the acid is hydrochloric acid or acetic acid.

29. A modified kaolin when prepared by the process of any one of claims 1–20.

30. An intercalate formed by the process of claim 21.

31. An intercalate as claimed in claim 30 wherein the salt is a divalent salt inclusive of salts of magnesium, calcium and copper.

32. A dehydroxylated kaolin formed by the process of claim 26.

33. Crystalline modified kaolins not being intercalates having the following properties:
  (i) an increased interlayer space compared to unmodified kaolins which have not undergone repeated expansion and contraction;
  (ii) an increased susceptibility to intercalation by cations, anions or salts compared to unmodified kaolins which have not undergone repeated expansion and contraction;
  (iii) an increased exfoliated morphology compared to unmodified kaolins which have not undergone repeated expansion and contraction: and
  (iv) an increased intercalation capacity compared to unmodified kaolins which have not undergone repeated expansion and contraction.

34. Crystalline modified kaolins as claimed in claim 33 which also have increased Full Half Maximum (FWHM) for X-ray reflections compared to unmodified kaolins.

* * * * *